(12) United States Patent
Leary et al.

(10) Patent No.: US 10,586,444 B2
(45) Date of Patent: Mar. 10, 2020

(54) MONITORING AND ALERT SYSTEM AND METHOD FOR LATCHING MECHANISMS

(71) Applicant: Lockliv Holdings Pty. Ltd., New South Wales (AU)

(72) Inventors: Andrew Leary, Sydney (AU); Richard Aplin, Sydney (AU); William Trieu, Sydney (AU); Matthew Redding, Sydney (AU); Lili Bykerk, Sydney (AU)

(73) Assignee: Lockliv Holdings PTY Ltd (AU)

( * ) Notice: Subject to any disclaimer, the term of this patent is extended or adjusted under 35 U.S.C. 154(b) by 485 days.

(21) Appl. No.: 15/287,871

(22) PCT Filed: Apr. 10, 2015

(86) PCT No.: PCT/AU2015/050163
§ 371 (c)(1),
(2) Date: Oct. 7, 2016

(87) PCT Pub. No.: WO2015/154146
PCT Pub. Date: Oct. 15, 2015

(65) Prior Publication Data
US 2017/0186308 A1 Jun. 29, 2017

(30) Foreign Application Priority Data
Apr. 10, 2014 (AU) ................................ 2014901322

(51) Int. Cl.
*G08B 29/00* (2006.01)
*G08B 29/18* (2006.01)
(Continued)

(52) U.S. Cl.
CPC ............ *G08B 29/181* (2013.01); *B60R 22/48* (2013.01); *E05B 41/00* (2013.01); *E05B 45/00* (2013.01);
(Continued)

(58) Field of Classification Search
CPC .... G08B 29/181; G08B 21/18; G08B 21/023; B60R 2022/4816; B60R 22/48; E05B 45/06; E05B 45/60
(Continued)

(56) References Cited

U.S. PATENT DOCUMENTS 6,448,907 B1  9/2002  Naclerio
6,809,640 B1  10/2004  Sherman
(Continued)

OTHER PUBLICATIONS

Australian Patent Office, International Search Report for PCT/AU2015/050163, dated Jun. 26, 2015.
(Continued)

*Primary Examiner* — Toan N Pham
(74) *Attorney, Agent, or Firm* — Miller & Martin PLLC

(57) ABSTRACT

A monitoring and alert system for retro-fitting to latching mechanisms. A master control unit is located proximate to an operator of the system. It includes a user interface having: an input enabling an operator to arm the system and then allow it to operate with minimal interaction of the operator. It also includes an output alerting the operator as to the status of the system in relation to a plurality of prescribed conditions. One or more slave units having sensing units detecting a latched and unlatched state are attached to a discrete latching mechanism for detecting the latching status thereof. Each slave unit comprises sensing means to detect whether the latching mechanism is in a latched state or an unlatched state.

22 Claims, 23 Drawing Sheets

(51) Int. Cl.
    *E05B 41/00*     (2006.01)
    *B60R 22/48*     (2006.01)
    *E05B 45/00*     (2006.01)
    *G07C 9/00*     (2020.01)
    *G08B 21/02*     (2006.01)
    *E05B 47/00*     (2006.01)
    *E05B 65/00*     (2006.01)
    *G08B 21/08*     (2006.01)

(52) U.S. Cl.
    CPC ..... *G07C 9/00166* (2013.01); *G07C 9/00309* (2013.01); *G08B 21/023* (2013.01); *G08B 21/0261* (2013.01); *B60R 2022/4816* (2013.01); *E05B 65/0007* (2013.01); *E05B 2047/0095* (2013.01); *E05B 2047/0097* (2013.01); *G07C 9/00896* (2013.01); *G07C 2009/00642* (2013.01); *G07C 2009/00793* (2013.01); *G08B 21/08* (2013.01)

(58) Field of Classification Search
    USPC ...................................... 340/509, 457, 457.1
    See application file for complete search history.

(56) References Cited

U.S. PATENT DOCUMENTS

| | | | |
|---|---|---|---|
| 6,888,475 B2 | 5/2005 | Darr | |
| 6,967,562 B2 | 11/2005 | Menard | |
| 7,002,457 B2* | 2/2006 | Stevenson | B60R 22/48 |
| | | | 180/286 |
| 7,710,288 B2* | 5/2010 | Seguchi | B60R 22/48 |
| | | | 335/177 |
| 8,289,145 B2* | 10/2012 | Miller | B60C 23/0408 |
| | | | 340/457 |
| 2003/0160689 A1* | 8/2003 | Yazdgerdi | B60N 2/2812 |
| | | | 340/457.1 |
| 2007/0205884 A1 | 9/2007 | Federspiel | |
| 2011/0090079 A1 | 4/2011 | Morino | |
| 2013/0135094 A1 | 5/2013 | Berstis | |

OTHER PUBLICATIONS

20190709 Lockliv P1032AU01 2019203235—Full Examination Report: AU Examination Report No. 1 for related AU Application 2019203235 by Lockliv Holdings Pty Ltd, Report Details on p. 3.

* cited by examiner

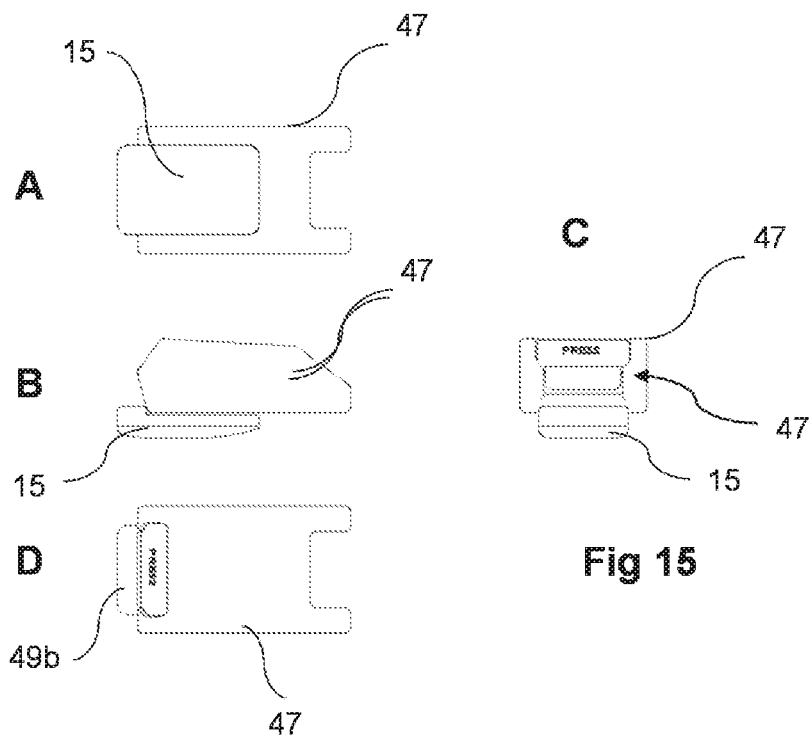
Fig 15
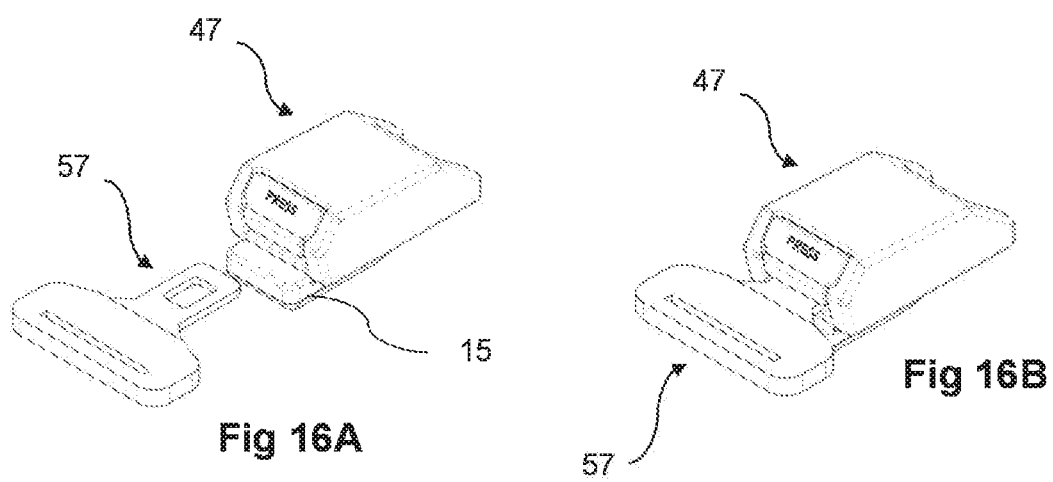
Fig 16A
Fig 16B

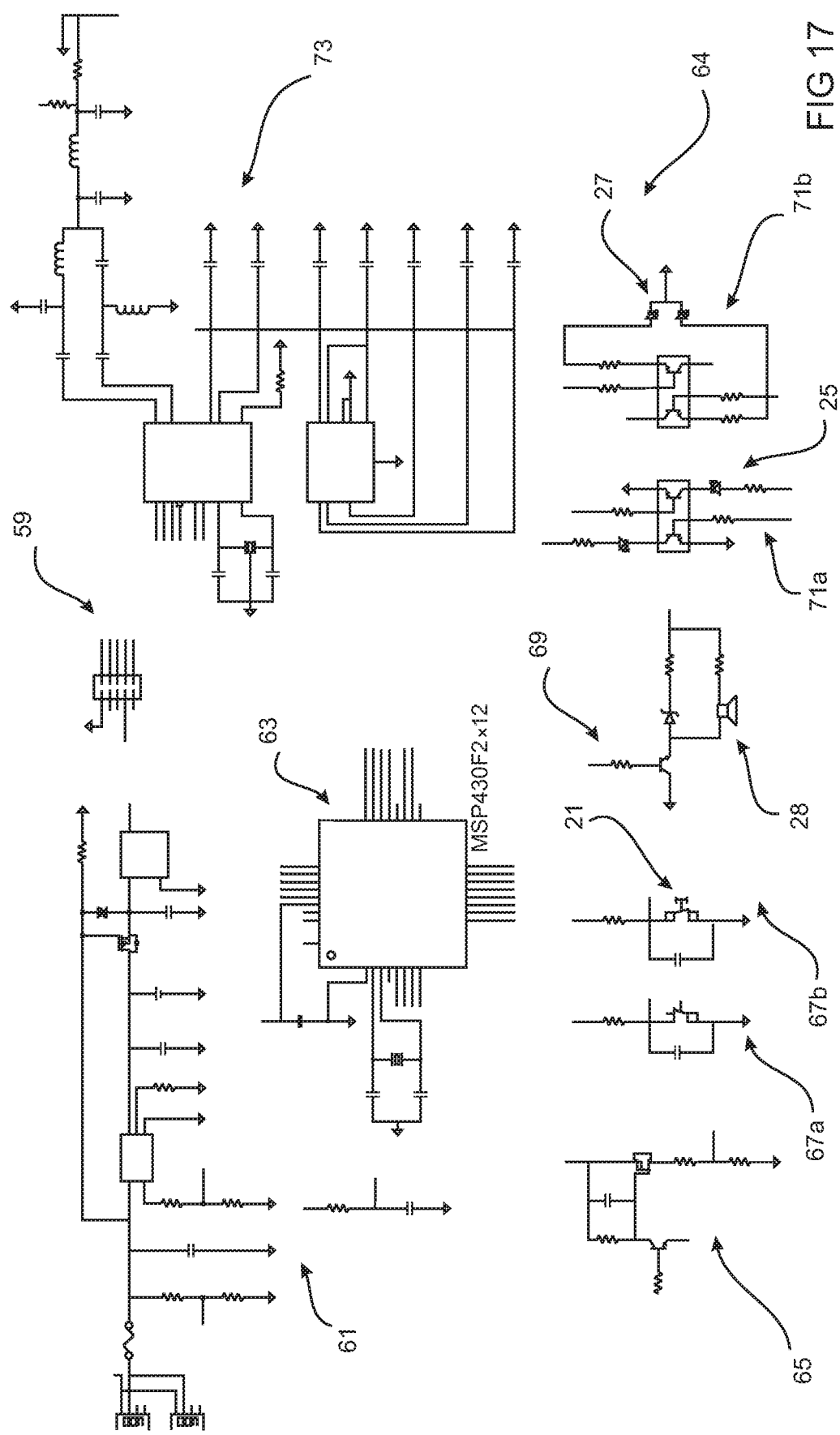

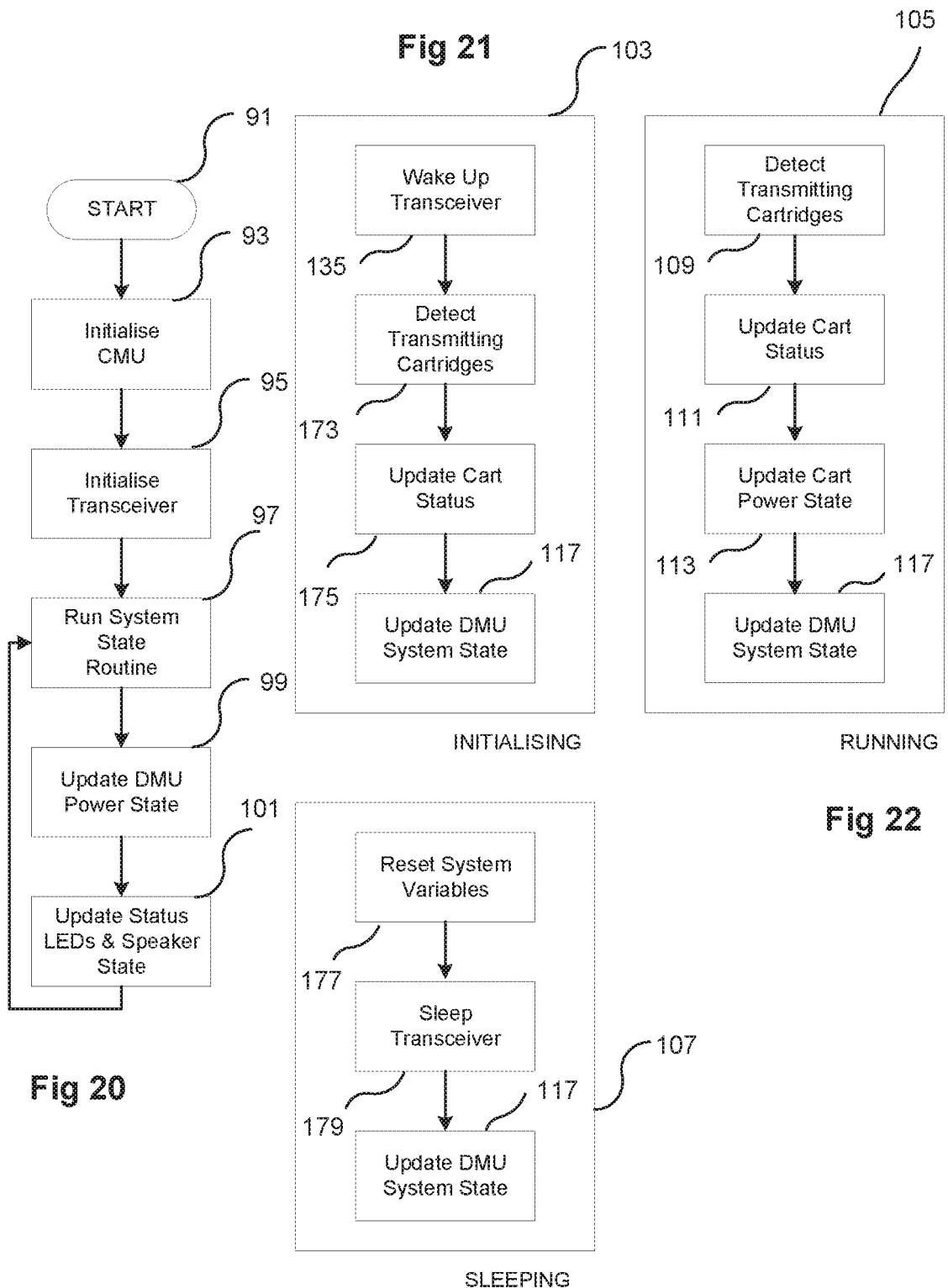

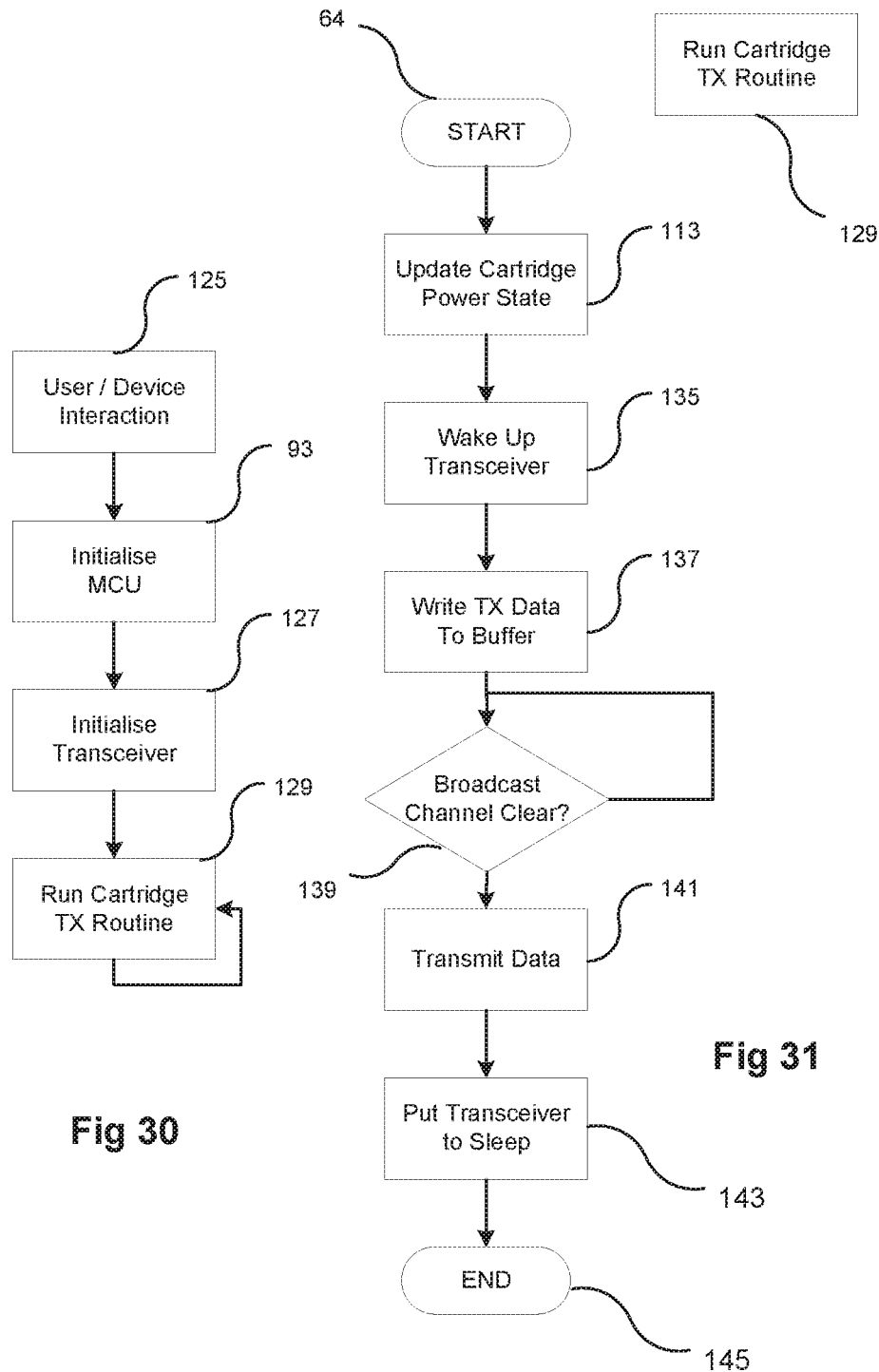

MONITORING AND ALERT SYSTEM AND METHOD FOR LATCHING MECHANISMS

CLAIM OF PRIORITY

This application is a National Stage continuation of Australian PCT/AU2015/050163 filed Apr. 10, 2015, which is incorporated herein by reference in its entirety, which claims priority to Australian Application 2014901322 filed Apr. 10, 2014.

FIELD OF THE INVENTION

This invention relates to monitoring and alert systems and methods for latching mechanisms. More particularly it is related to retro-fitted systems that have utility in providing monitoring and alert functionality for detecting and alerting a person when the latching mechanism is released, after the latching mechanism has been originally installed without such functionality.

The invention has particular utility with the installation of latching mechanisms for safety purposes, such as seat belts in all types of vehicles and swimming pool gates, especially where young children are concerned and the purpose of the latching mechanism to ensure the safety of children.

Throughout the specification, unless the context requires otherwise, the word "comprise" or variations such as "comprises" or "comprising", will be understood to imply the inclusion of a stated integer or group of integers but not the exclusion of any other integer or group of integers.

BACKGROUND ART

The following discussion of the background art is intended to facilitate an understanding of the present invention only. It should be appreciated that the discussion is not an acknowledgement or admission that any of the material referred to was part of the common general knowledge as at the priority date of the application.

In one area of activity involving the restraint of persons where the invention has particular, but not exclusive, utility, there is increasing awareness of the importance of safety for persons where a latching mechanism is relied upon for restraining a person to an object such as a seat when travelling in a motor vehicle or the like. There is a similar awareness of the importance of safety in another area of activity involving the restriction of access of particular persons to an enclosed area via a gate, where the invention also has particular, but not exclusive, utility. In this area strict regulations have been introduced into society to ensure compliance with the installation and operation of latching mechanisms to prevent or limit the access of children to the area.

However, despite the best intentions of adults to whom such regulations are directed, where young children are involved who are not well equipped to understand issues of safety and adherence to regulations, extra vigilance is required by adults to monitor the activity of their children constantly and ascertain when a latching mechanism restraining a child or restricting access of a child to an area is released, thereby creating a dangerous situation for the child and potentially causing the adult to breach regulatory compliance requirements. Oftentimes the adult is unable to exercise this extra vigilance due to their requirement to focus on other activities from their own safety perspective and could benefit from some additional prompting.

For example, in the case of motor vehicle safety and seatbelt use, an adult driving a motor vehicle may not be able to monitor the latching status of seatbelts in the rear of the vehicle during driving. This may be despite the adult ensuring passengers in the rear are buckled up at the onset of the journey, and due to the attention required to focus on driving the vehicle safely and complying with road regulations. Hence, if a child finds occasion to release the latching mechanism of their seatbelt, even if intended only momentarily during the journey, the seatbelt may not be re-buckled due to the poor attention span of the child, exposing the child to a dangerous state if an accident was to occur.

Original equipment manufacturers (OEMs) of motor vehicles have improved seatbelt monitoring systems over the years to address these safety requirements; however, it is only in recent times that these systems have been developed with enough sophistication to detect the latching status of seatbelts in the rear. One of the problems confronting designers in this area is that the rear seatbelts are not always used, and therefore relatively expensive sensing equipment is required to determine the presence of a passenger as well as the latching status of the belt itself to determine whether a seatbelt has become unbuckled during travel, exposing the passenger to a dangerous state.

These sophisticated systems generally entail the use of weight sensing devices integrated into the structure of the seat base and sense whether a person is seated in a particular seat before the latching status of the seatbelt for the seatbelt is monitored. These devices are bulky and expensive, and are impractical to retro-fit into vehicles that were not originally fitted with such sensing devices by the OEM.

Consequently, there are a large number of vehicles that do not have OEM designed rear seatbelt monitoring systems, or if they do, these devices are not adequate to provide the requisite level of monitoring required.

Some attempts have been made to develop retro-fitted monitoring and alert systems for rear seatbelts in the past, however, these systems have proven to be of inferior quality, suffering power failure, unreliable communication and flimsy design, allowing them to be relatively easily disassembled or bypassed.

Another example of latching mechanisms requiring monitoring of access to potentially dangerous areas are those fitted to gates of swimming pool enclosures. These gates involve a latching mechanism that is operated from an elevated position on the gate so as to be out of reach of children. However, given their industrious and innovative nature, children can often find ways of climbing up and operating the mechanism, allowing them access through the gate.

Presently there is no regulatory requirement to have a monitoring and alert system installed with these types of latching mechanisms and consequently virtually all swimming pool gates will rely simply on the physical operation of the latching mechanism to deter children from accessing swimming pool enclosures.

Clearly having regard to the above circumstances, there is a need for a well-designed and highly functional monitoring and alert system that is capable of being retro-fitted to sense the status of latching mechanisms such as rear seatbelts and gates for swimming pool enclosures that is not being met at the present time.

DISCLOSURE OF THE INVENTION

An object of the present invention is to overcome at least some of the problems associated with prior art monitoring and alert systems that attempt to provide retro-fitting functionality but which have not attained market acceptance due to inadequacies in design and operation, or at least provide a viable alternative to such systems that may meet with market acceptance.

In accordance with one aspect of the present invention, there is provided a monitoring and alert system for retro-fitting to latching mechanisms including:

a master control unit to be located proximate to an operator of the system, comprising a user interface having:
 (a) an input or input means to enable an operator to arm the system and then allow it to operate with minimal interaction of the operator;
 (b) an output or output means for alerting the operator as to the status of the system in relation to a plurality of prescribed conditions; and
 (c) a master processor or master processing means to provide the functionality of the master control unit;

one or more slave units each being fixedly attached to a discrete latching mechanism for detecting the latching status thereof, each slave unit comprising:
 (i) a sensor or sensing means to detect whether the latching mechanism is in a latched state or an unlatched state, and
 (ii) a slave processor or slave processing means to provide the functionality of the slave unit; and a communicator or communication means for communicating periodically status and alert signals between the master control unit and each of the slave units;

wherein the master processor and the slave processor are designed to invoke various initialising processes and running processes for the master control unit and running phase respectively, involving interaction with the operator via the user interface, the initialising processes including a detect slave process and an update slave process to identify the latching status of each of the slave units.

Preferably, a said slave unit also comprising: a slave power supply or slave power supply means for providing local power to the slave unit; and a slave power supply monitor or slave power supply monitoring means to monitor the level of local power supplied to the slave unit and indicate when the level is below a prescribed threshold for reliable operation thereof; and wherein during a running phase the master processing means is designed to invoke:
 (A) a system state process to ascertain the latest latching status of each of the slave units whilst ensuring minimal power consumption by the master control unit;
 (B) a power state process to check with the slave power supply monitor that the local power level is not below the prescribed threshold;
 (C) a user interface process to process input signals from the input and update the output to convey the latest latching and power state status to the operator;

Preferably, the slave processor is designed to invoke a slave unit status routine to transmit a power alert signal if the slave power supply monitor indicates that the local power is below the prescribed threshold, and the latching status of the slave unit, whilst ensuring minimal power consumption by the slave unit.

Preferably, the communicator comprises a master transceiver forming part of the master control unit and a slave transceiver forming part of each slave unit for wirelessly communicating status and alert signals between the master control unit and each of the slave units.

Preferably, the master control unit includes:
 (a) a master power supply or master power supply means for providing local power to the master control unit; and
 (b) a master power supply monitor or master power supply monitoring means to monitor the level of the local power supplied to the master control unit and indicate when this is below a prescribed threshold for reliable operation thereof.

Preferably, the slave processor invokes sleep processes for a slave unit during a sleeping phase that cycle through a hibernating low power state and high power transmitting state, to communicate an update of the latching status to the master control unit.

In accordance with another aspect of the present invention, there is provided a master control unit for a retro-fitted monitoring and alert system for latching mechanisms including one or more slave units each being fixedly attached to a discrete latching mechanism for detecting the latching status thereof, each slave unit comprising:

a sensor or sensing means to detect whether the latching mechanism is in a latched state or an unlatched state; and
 (i) a slave transceiver forming part of the communicator wirelessly communicating periodically status and alert signals between the slave unit and the master control unit;

the master control unit to be located proximate to an operator of the system and comprising:
 (a) a user interface having: an input enabling an operator to arm the system and then allow it to operate with minimal interaction of the operator; and an output alerting the operator as to the status of the system in relation to a plurality of prescribed conditions;
 (b) a master processor providing the functionality of the master control unit; and
 (c) a master transceiver forming part of the communication means for wirelessly communicating status and alert signals between the master control unit and each of the slave units;

wherein the master processor and the slave processor are designed to invoke various initialising processes for the master control unit and each of the slave units during a start-up mode involving interaction with the operator via the user interface, these initialising processes including identifying the latching status of each of the slave units.

Preferably, each slave unit further comprises: a slave power supply providing local power to the slave unit; and a slave power supply monitor monitoring the level of local power supplied to the slave unit and indicate when this is below a prescribed threshold for reliable operation thereof; and wherein during a running phase: the master processor is designed to invoke:
 (A) a system state process to ascertain the latest latching status of each of the slave units whilst ensuring minimal power consumption by the master control unit;
 (B) a power state process to check with the slave power supply monitor to verify that the local power level is not below the prescribed threshold;
 (C) a user interface process to process input signals from the input and update the output to convey the latest latching and power state status to the operator.

Preferably, the slave processing means is designed to invoke a slave unit status routine to transmit a power alert signal if the slave power supply monitor indicates that the local power is below the prescribed threshold, and the latching status of the slave unit, whilst ensuring minimal power consumption by the slave unit.

Preferably, the master control unit includes a master power supply providing local power to the master control unit; and a master power supply monitor monitoring the level of local power supplied to the master control unit and indicate when this is below a prescribed threshold for reliable operation thereof.

Preferably, the master transceiver communicates status and alert signals between the master control unit and each of the slave units wirelessly via the communication means.

In accordance with a further aspect of the present invention, there is provided a slave unit for a retro-fitted monitoring and alert system for latching mechanisms including a master control unit to be located proximate to an operator of the system, the master control unit comprising:
- (a) a user interface having: input means to enable an operator to arm the system and then allow it to operate with minimal interaction of the operator; and output means for alerting the operator as to the status of the system in relation to a plurality of prescribed conditions; and
- (b) a master transceiver forming part of a communication means for wirelessly communicating status and alert signals from the slave unit;

the slave unit being fixedly attached to a discrete latching mechanism for detecting the latching status thereof, each slave unit comprising:
- (i) sensing means to detect whether the latching mechanism is in a latched state or an unlatched state,
- (ii) slave processing means to provide the functionality of the slave unit; and
- (iii) a slave transceiver forming part of a communication means for communicating periodically status and alert signals to the master control unit;

wherein the slave processing means is designed to invoke various initialising processes for the slave unit during an initialisation phase involving interaction with the master control unit to communicate the latching status of the slave unit.

Preferably, the slave unit includes: slave power supply means for providing local power to the slave unit; and slave power supply monitoring means to monitor the level of local power supplied to the slave unit and indicate when the level is below a prescribed threshold for reliable operation thereof; and wherein during a running phase the slave processing means, in response to the master processing means, is designed to invoke:
- (A) an update status process to provide the latest latching status of the slave unit whilst ensuring minimal power consumption;
- (B) an update power state process to indicate that the local power level is not below the prescribed threshold.

Preferably, the slave processing means is designed to invoke a slave unit status routine to transmit a power alert signal if the slave power supply monitoring means indicates that the local power is below the prescribed threshold, and the latching status of the slave unit, whilst ensuring minimal power consumption by the slave unit.

Preferably, the slave transceiver communicates status and alert signals to the master control unit wirelessly via the communication means.

Preferably, the slave processing means invokes sleep processes for a slave unit during a sleeping phase that cycle through a hibernating low power state and high power transmitting state, to communicate an update of the latching status to the master control unit.

Further still, in accordance with another aspect of the present invention, there is provided a method for monitoring and alerting the latching status of a latching mechanism including:
- (i) initialising during a start up mode, a locally powered master control unit located proximate to an operator to determine the latching status of the latching mechanism, and a locally powered slave unit to be attached to the latching mechanism, involving interaction with the operator to identify the latching status of the latching mechanism;
- (ii) during a running phase:
  - (A) ascertaining the latest latching status of the latching mechanism whilst ensuring minimal power consumption by the master control unit and the slave unit;
  - (B) checking that the local power supply level for master control unit and the slave unit is not below a prescribed threshold;
  - (C) wirelessly communicating periodically status and alert signals between the slave unit and the master control unit; and
  - (D) conveying the latest latching and power state status to the operator.

BRIEF DESCRIPTION OF THE DRAWINGS

The invention will be better understood in the light of the flowing description of the best mode for carrying out the invention. The description is made with reference to the following drawings that consist of schematic diagrams of various aspects of a system according to different embodiments of the present invention, and its operation and use; wherein:

FIG. 15 is a series of orthogonal views of FIG. 14, wherein:
A is a top view;
B is a side view;
C is an end view; and
D is a bottom view;

FIG. 16A is a similar view to FIG. 14 showing the latching plate of the seat belt in an unfastened position;

FIG. 16B is a similar view to FIG. 16A, but showing the latching plate in a fastened position;

FIG. 17 is a circuit diagram of the DMU PCB of FIG. 4;

FIG. 20 is a high level flow chart showing the main processes performed by the master control unit and the slave units;

FIG. 21 is a high level flow chart showing the main processes performed during the initialising phase;

FIG. 22 is a high level flow chart showing the main processes performed during the running phase;

FIG. 23 is a high level flow chart showing the main processes performed during the sleeping phase;

FIGS. 29A, 29B and 29C are lower level flow charts showing the update status LEDs and speaker state process of the master control unit and the slave units shown in FIG. 4, wherein:

FIG. 29A shows the process flow for the update status LEDs and speaker state process for the amber LED;

FIG. 29B shows the process flow for the update status LEDs and speaker state process for the bi-coloured LEDs; and FIG. 29C shows the process flow for the update status LEDs and speaker state process for the blue LED;

FIG. 30 is a high level flow chart showing the main processes performed by the slave units;

FIG. 31 is a lower level flow chart showing the run cartridge Tx routine process of the slave units shown in FIG. 14;

BEST MODE(S) FOR CARRYING OUT THE INVENTION

The best mode for carrying out the invention is described with respect to several specific embodiments all directed towards a retro-fitted monitoring and alert system for latching mechanisms and a method for operating same that allows a person to arm the system and alert a person in the vicinity or remotely of the latching mechanism, when the mechanism is released.

The first specific embodiment is adapted for retro-fitting the monitoring and alert system to a set of latching mechanisms in the form of rear seat belt assemblies in a motor vehicle 11. In this embodiment, a driver of the vehicle may arm the system after buckling up the passengers in the rear seats, and then have the system monitor the rear seat belts and alert the driver when a seat belt is unbuckled, i.e. when the latching mechanism is released.

Figure 1:
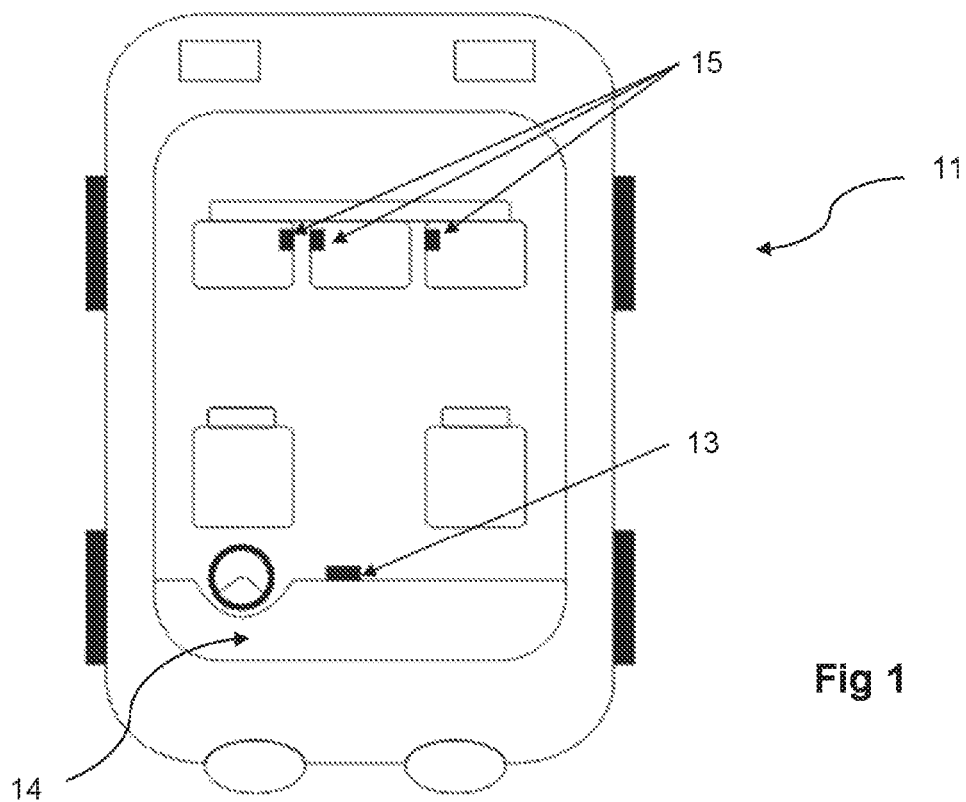
FIG. 1 is a schematic plan view showing the general spatial location of a dash mounted unit (DMU) and cartridge units (CMU) that constitute the monitoring and alert system in accordance with the first specific embodiment of the invention.
Figure 2:
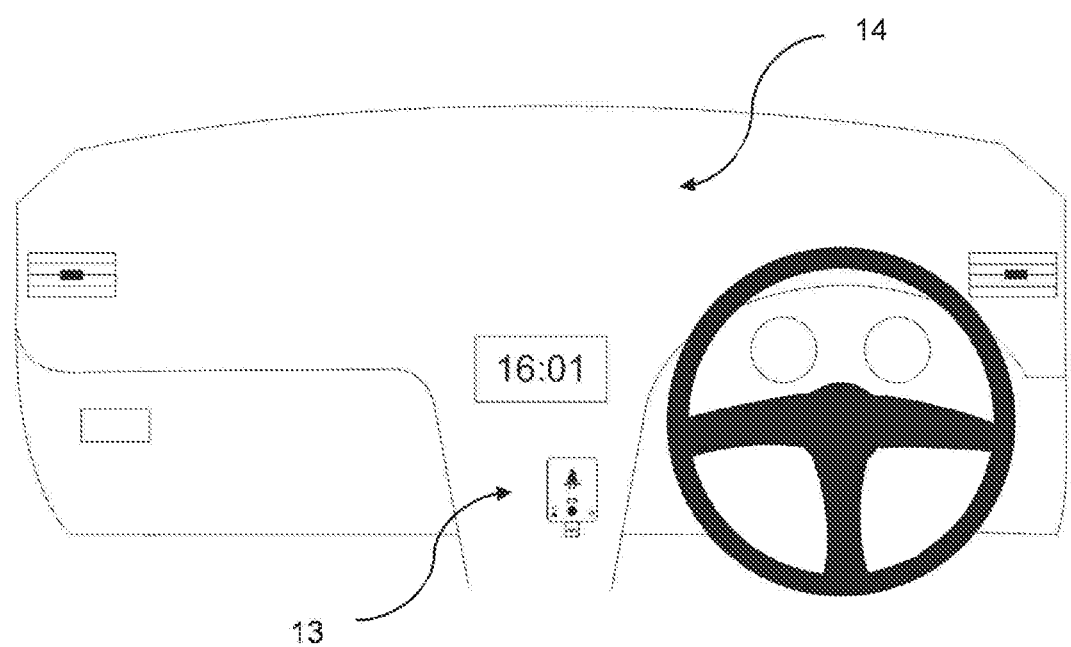
FIG. 2 is a schematic drawing showing the location of the DMU on the dashboard of the motor vehicle shown in FIG. 1.

The monitoring and alert system generally comprises a master control unit and a plurality of slave units. In the present embodiment, the master control unit is mounted within a Dashboard Mounted Unit (DMU) 13 for retro-fitted mounting to a dashboard 14 of the motor vehicle 11 as shown in FIGS. 1 and 2 of the drawings. The slave units in the present embodiment are Cartridge Mounted Units (CMUs) 15 that are retro-fitted in a fixed mounting arrangement to each of the rear seatbelt latches as shown in FIG. 1 of the drawings.

As shown in FIGS. 3 to 8, the DMU 13 comprises a front-casing 13a and a rear-casing 13b that encapsulates a DMU Printed Circuit Board (PCB) 17.

The front-casing 13a is embossed with various indicia and is provided with various apertures to accommodate and provide access to a various inputs, outputs, and input/output means, which are surface-mounted onto the DMU PCB 17.

The input may include a power push-button 19, an acknowledge button 21, and a DMU battery 22. The output may include a yellow (amber) cartridge battery indicator light emitting diode (LED) 23, a blue power LED 25, a bi-coloured LED (i.e. red and green) 27, indicating whether the rear seatbelts are in an unbuckled condition (red) or a buckled condition (green), and a speaker 28. The input/output means may include a male USB connector 29 for providing a remote power source to charge the DMU battery 22 and a DMU transceiver.

Figures 6A, 6B:
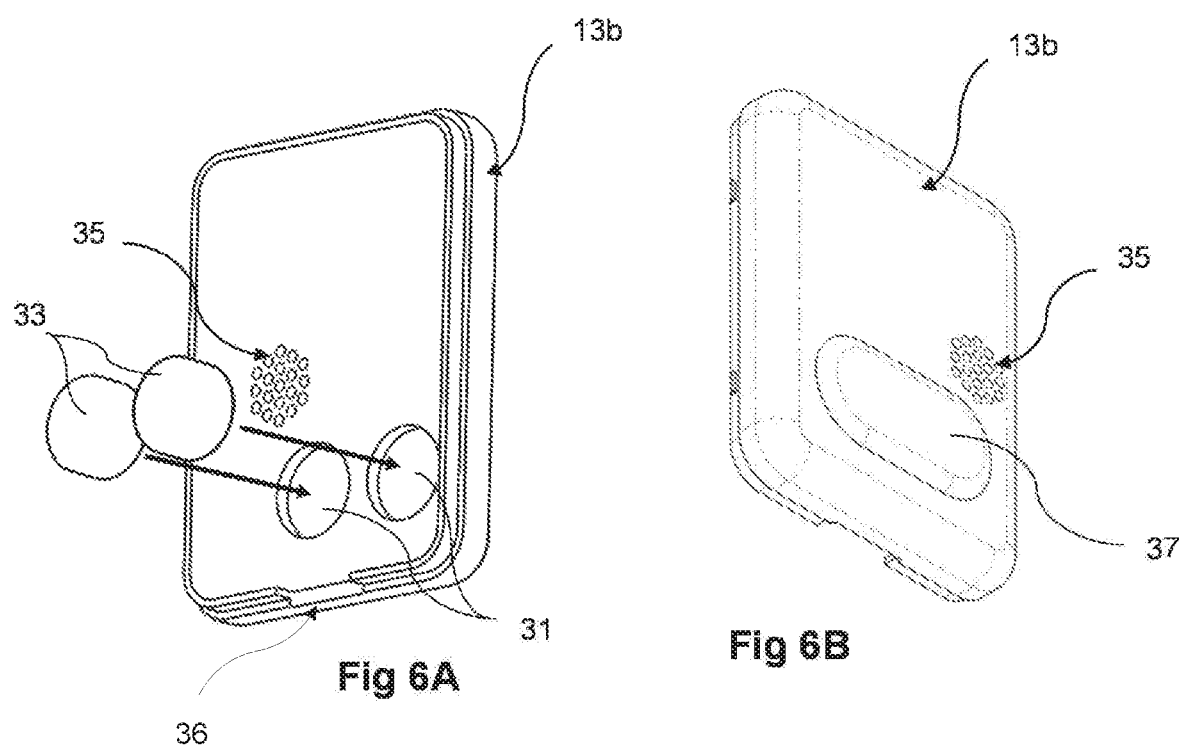
FIG. 6A is an inner perspective view of the rear casing of the DMU of FIG. 3 showing the assembly of the magnet units into the magnet recesses of the casing.
FIG. 6B is an outer perspective view of the rear casing of FIG. 6A.

The rear DMU casing 13b includes recesses 31 accommodating mounting magnets 33, apertures 35 to allow the propagation of sound waves from the speaker 28, and an aperture 36 for accommodating the USB connector 29, as shown in FIG. 6A. The outer casing 13b, as shown in FIG.

Figure 5:
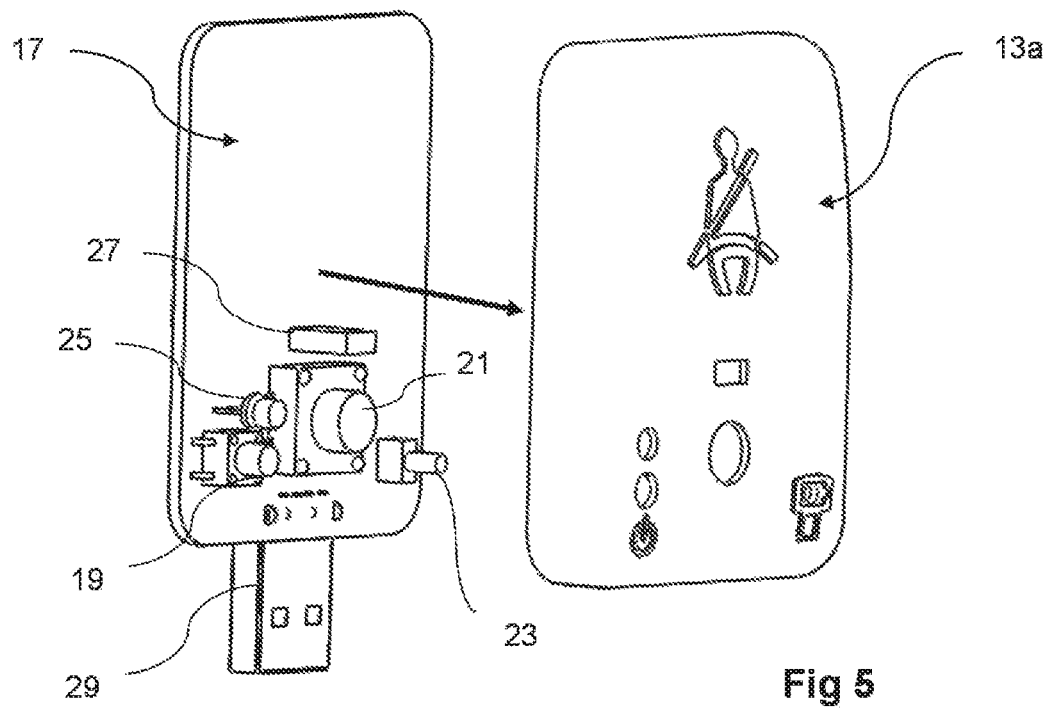
FIG. 5 is an exploded view showing the assembly of the DMU PCB into the front casing of the DMU of FIG. 3.
Figure 7:
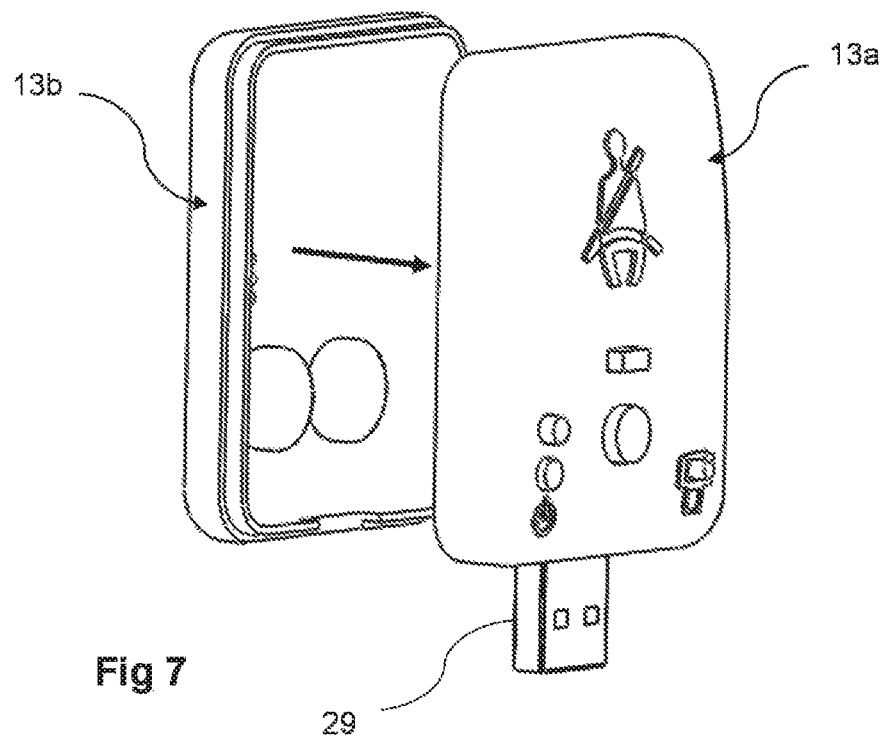
FIG. 7 is a front perspective view showing the assembly of the rear casing to the front casing of the DMU of FIG. 3, encapsulating the DMU PCB therein.
Figure 8:
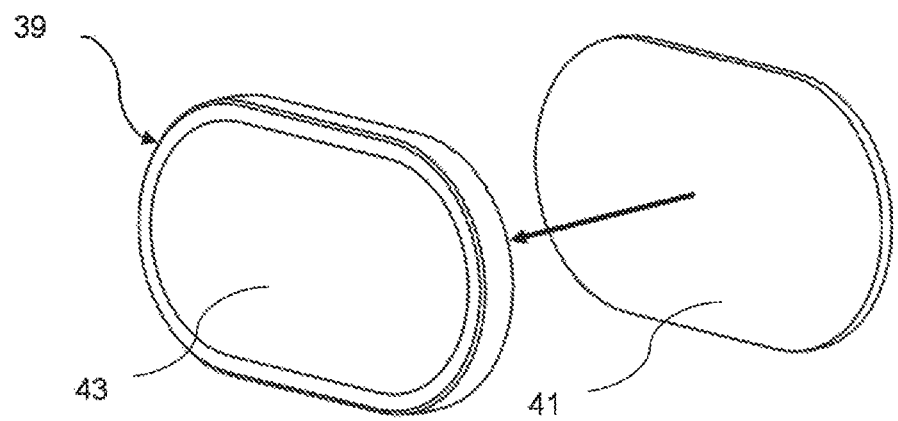
FIG. 8 is a front perspective view showing the DMU mounting plate for the DMU of FIG. 3 and adhesive for mounting the DMU mounting plate to the dashboard.

6B of the drawings includes a convex-shaped protrusion 37 which forms a backing plate for accommodating the mounting magnets 33 to facilitate retro-fitting location of the DMU 13 at a convenient location on the dashboard 14. This is achieved in conjunction with a mounting plate 39, as shown in FIG. 8 of the drawings. The DMU 13 is assembled by positioning the DMU PCB 17 within the front casing 13a as shown in FIG. 5 of the drawings and snapping the rear casing 13b into locking engagement with the remainder of the assembly as shown in FIG. 7.

The mounting plate 39 is made of a suitable ferromagnetic substance and is positioned at a convenient place on the dashboard 20 by a double-sided adhesive strip 41 being adhered on one side to the dashboard; and then to the rear of the mounting plate on the other side.

The mounting plate includes a correspondingly concave-shaped recess 43 complementary to the shape and configuration of the protrusion 37. In this manner, the DMU 13 may be positioned so that the protrusion 37 snaps into magnetically locking engagement with the mounting plate 39 for releasable positioning on the dashboard 14.

The CMU 15 is shown in FIGS. 9 to 13 and comprises a top casing 15a, a rear casing 15b and an encapsulated CMU PCB 45. The CMU casing is specially designed to be retro-fitted to a seatbelt latch 47 as shown in FIGS. 13 to 16. Moreover, the rear case 15b is L-shaped in side elevation, having a recessed portion 49a and a cantilevered portion 49b. This arrangement presents an inner stepped configuration on the inside of the rear casing, whereby the CMU PCB 45 can be mounted on an inner landing surface 51a of the stepped configuration and a recessed portion 51b can accommodate sensing components 53 forming part of a sensor surmounted on the confronting face 45a of the CMU PCB 45.

The sensor of the CMU PCB 45 may comprise a reed switch 53a and an in-line magnet 53b, which constitute the sensing components 53 and are mounted towards the top of the confronting face 45a. A CMU battery 54 is mounted on the opposite face 45b of the CMU PCB 45 that confronts the inner side of the front CMU casing 15a. The sensing components 53 can be disposed towards the top end of the CMU PCB 45 and are particularly configured so that they are fully accommodated within the recessed portion 51b of the rear casing 15b.

Figures 9, 11:
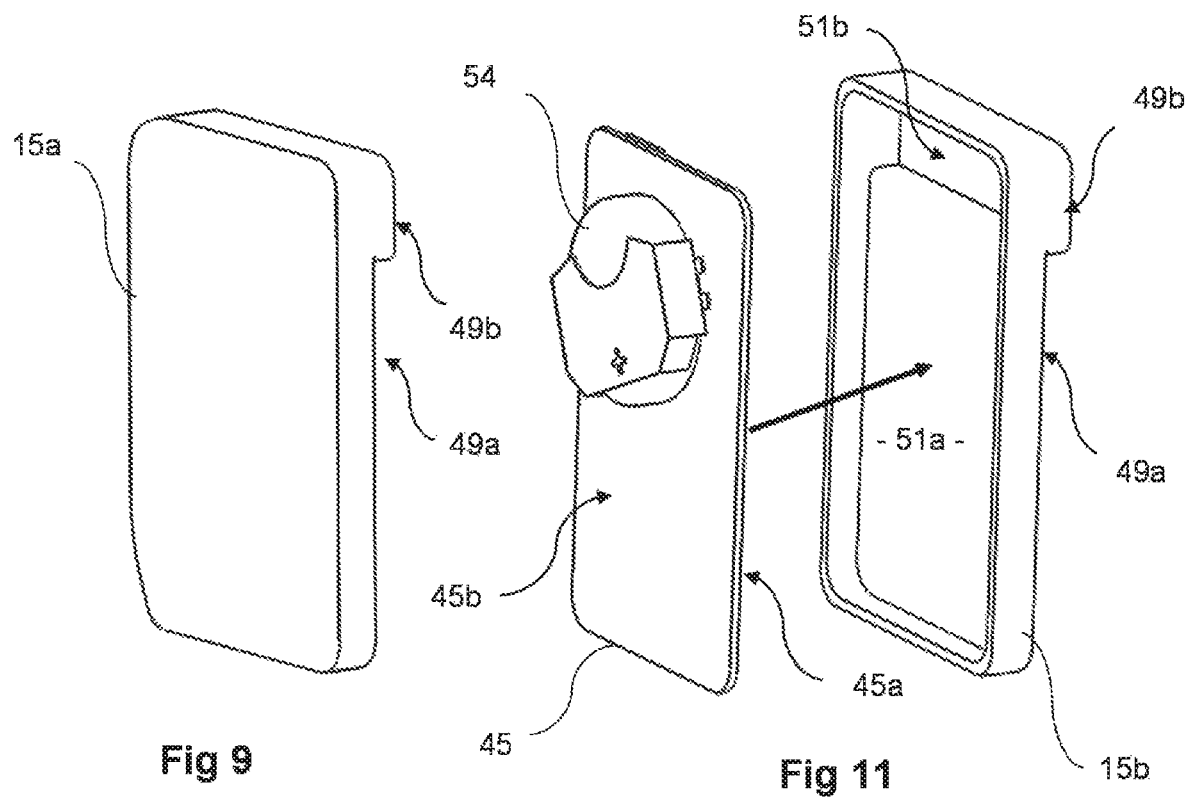
FIG. 9 is a front perspective view of the CMU of FIG. 1.
FIG. 11 is an exploded view showing the assembly of the CMU PCB into the rear casing of the CMU of FIG. 9.
Figures 10, 12:
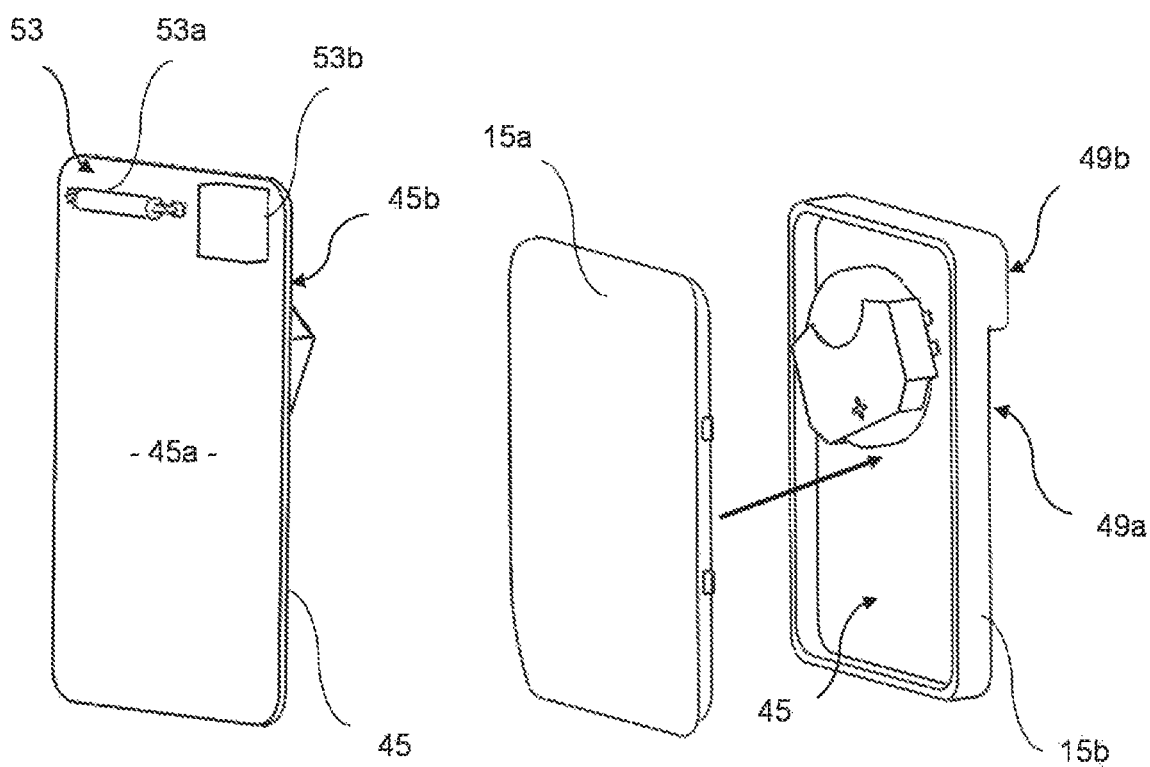
FIG. 10 is a rear perspective view of the CMU PCB that is encapsulated within the casing of the CMU of FIG. 9, showing the configuration of the reed switch and magnet.
FIG. 12 is an exploded view showing the assembly of the front casing to the rear casing of the CMU of FIG. 9, encapsulating the CMU PCB therein.
Figure 13:
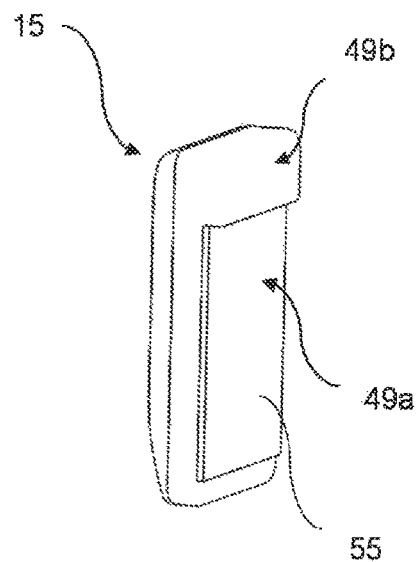
FIG. 13 is a rear perspective view of the CMU of FIG. 9 showing the adhesive tape in position for mounting the CMU to the seat belt latch.
Figure 13A:
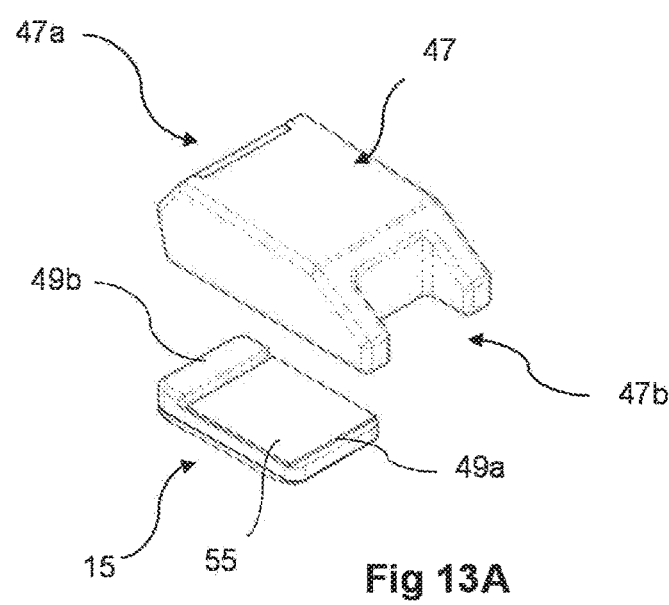
FIG. 13A is an exploded view of the rear top of the seat belt latch showing the assembly of the CMU shown in FIG. 13 to the bottom of the seat belt latch.
Figure 13B:
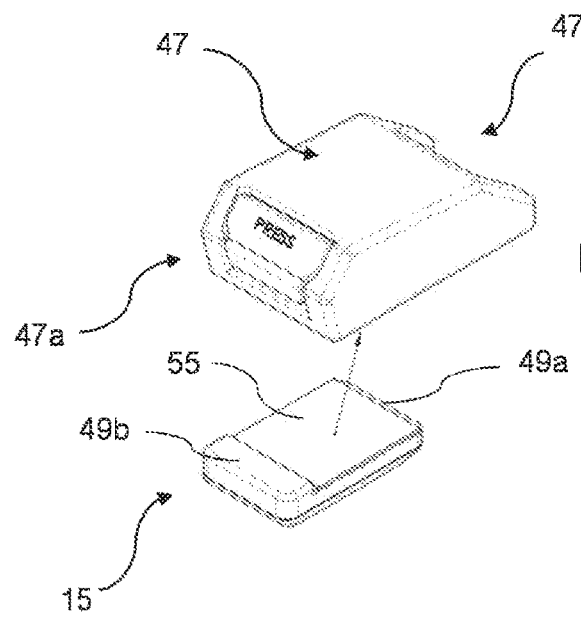
FIG. 13B is a similar view to FIG. 13B, but showing the assembly from the front top of the seat belt latch.
Figure 14:
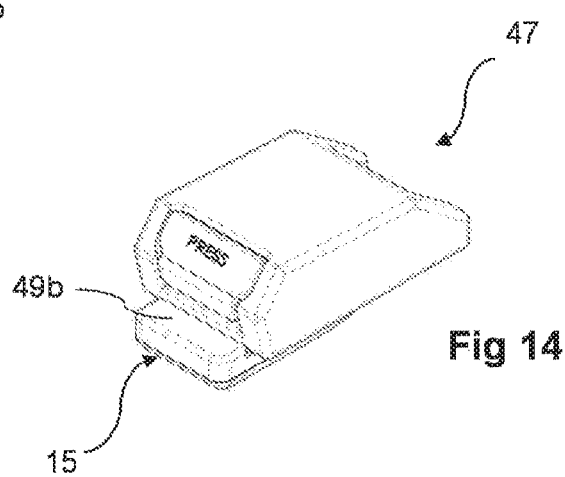
FIG. 14 is a front top perspective view of the seat belt latch shown in FIGS. 13A and 13B with the CMU fully fitted ready for operation.

As shown in FIGS. 11 & 12, the CMU 15 is assembled by positioning the CMU PCB 45 in the manner indicated within the rear casing 15b and snap locking the front casing 15a in position to encapsulate the CMU PCB 45 therein.

The recessed portion 49a is shaped to receive a two-sided layer of adhesive tape 55 to fixedly adhere the CMU 15 to the underside of a rear seatbelt latch 47 so that the cantilevered portion 49b marginally protrudes over the front end 47a of the latch 47, adjacent to the slot for receiving a plate 57 of the seatbelt, and the recessed portion 49a is adhered firmly to the bottom of the seatbelt latch 47 extending toward the rear end 47b of the latch. The particular mounting arrangement is well shown in FIGS. 13 to 15.

The mounting arrangement enables the sensing components 53 to be disposed directly beneath the socket at the front end 47a of the seatbelt latch, so that when the seatbelt plate 57 comes into fastening engagement with the seatbelt latch 47 the reed switch 53a is actuated, enabling the sensor or sensing means to signify to the CMU circuit that the seatbelt is in a fastened status, as shown in FIG. 16B of the drawings. When the seatbelt plate 57 is disposed remotely of the seatbelt latch 47 as shown in FIG. 16A of the drawings, the reed switch 53a is switched to an opposing state signifying that the seatbelt is in an unfastened state, as shown in FIG. 16A.

The DMU PCB 17 incorporates a DMU circuit 59 as shown in FIG. 17 of the drawings. The DMU circuit 59 includes a battery monitoring circuit 61 connected to the USB; a microcontroller circuit 63; and a user interface 64 including a battery-powered circuit 65; push button circuits 67a for the power button 19 and 67b for the acknowledge button 21; a speaker circuit 69 for the speaker 28; lighting circuits 71a for the yellow (amber) LED 23 and the blue LED 25, and 71b for the bi-coloured LED 27; and DMU transceiver 73 for communicating with the CMU 15.

Figure 18:
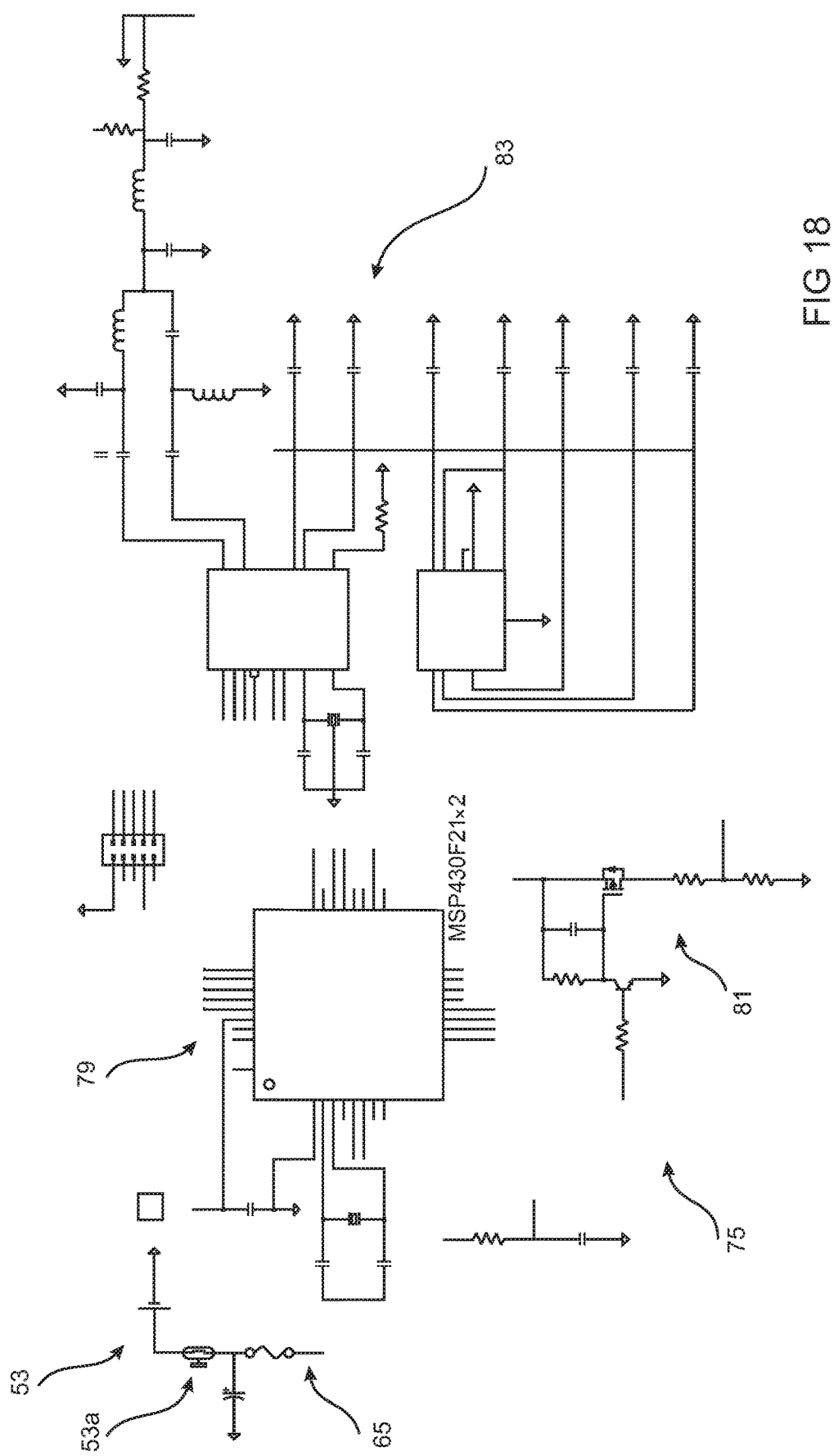
FIG. 18 is a circuit diagram of the CMU PCB of FIG. 10.

A CMU circuit 75 is incorporated into the CMU PCB 45, and as shown in FIG. 18. The CMU circuit includes an enabling circuit 77 incorporating the sensing components 53; a CMU microcontroller circuit 79; a battery monitoring circuit 81; and CMU transceiver 83 to communicate with the DMU transceiver 73.

The software processors operating the monitoring and alert system in both the DMU 13 and the CMU 15 are described in FIGS. 19 to 31.

Figure 19:
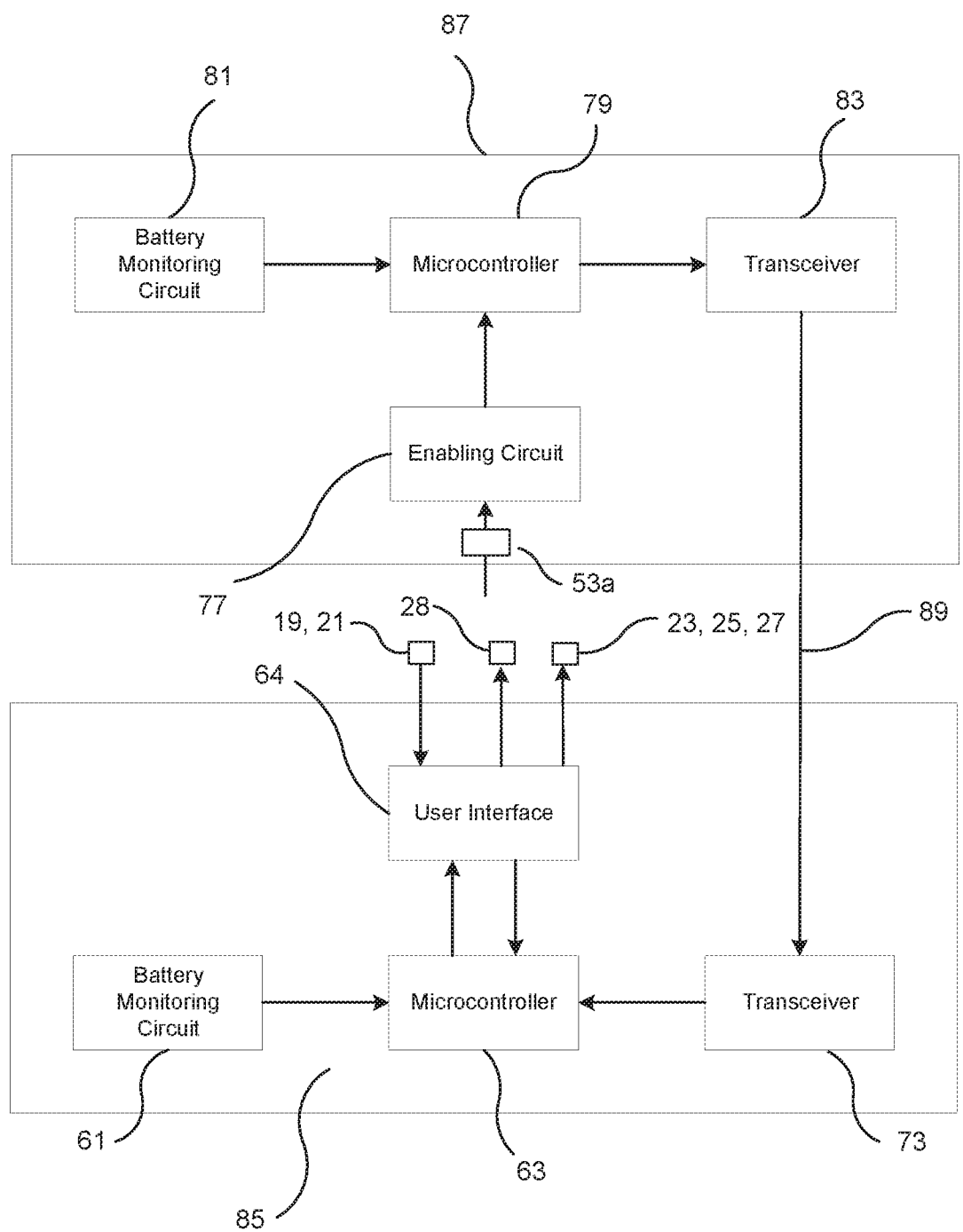
FIG. 19 is schematic block diagram showing the general hardware structure of the monitoring and alert system.

As shown in FIG. 19 and described in relation to FIG. 17, the DMU 13 which functions as the master control unit 85 of the monitoring and alarm system includes the battery monitoring circuit 61; the DMU microcontroller circuit 63; the DMU transceiver 73; and the user interface 64, that connects with the pushbuttons 19 and 21, speaker 28 and LEDs 23, 25 and 27.

The slave units 87 each in the form of a CMU 15 and described with reference to FIG. 18, include the enabling circuit 77 to be actuated by the reed switch 53a, the CMU microcontroller circuit 79, the battery monitoring circuit 81 and the CMU transceiver 83. Importantly, the master control unit 85 and slave units 87 are in constant communication via an RF transmission link 89 arising from the 'transmit' and 'receive' signals sent between the DMU transceiver 73 and CMU transceiver 83.

The main processes performed by the monitoring and control system are shown in FIG. 20, whereupon following start-up at 91 various slave initialisation processes are invoked, including an initialise CMU process 93, followed by an initialise transceiver process 95, followed by a run system state routine 97. The run system state routine invokes an update DMU power state process 99, which is shown in more detail in FIG. 27, followed by an update status LEDs & speaker state process 101, which is shown in more detail for each type of LED in FIGS. 29A, 29B and 29C. The system returns to the run systems state routine 97 and loops through the latter processes as indicated in the drawing.

The main processes performed by the DMU 13 are essentially broken down into: the initialising phase 103 shown in FIG. 21, which includes a series of master initialisation processes; the running phase 105 shown in FIG. 22; and the sleeping phase 107 shown in FIG. 23.

The series of master initialisation processes that are run during the initialising phase 103 include a Wake Up Transceiver process 135, a Detect Transmitting Cartridges Process 173, an Update Cartridge Status process 175 and an Update DMU System State process 117.

The running phase 105 includes a series of running processes that are run by the system according to the program flow indicated by, and shown in more detail in FIGS. 24 to 29. These include a Detect Transmitting Cartridges process 109, an Update Cartridge Status process 111, an Update Cartridge Power State process 113 and the Update DMU System State process 117 to complete the running phase.

The sleeping phase 107 includes a series of sleep processes that are run by the system when invoked, including a Reset System Variables process 177, a Sleep Transceiver process 179 and the Update DMU System State process 117 to complete the sleeping phase.

Figure 24:
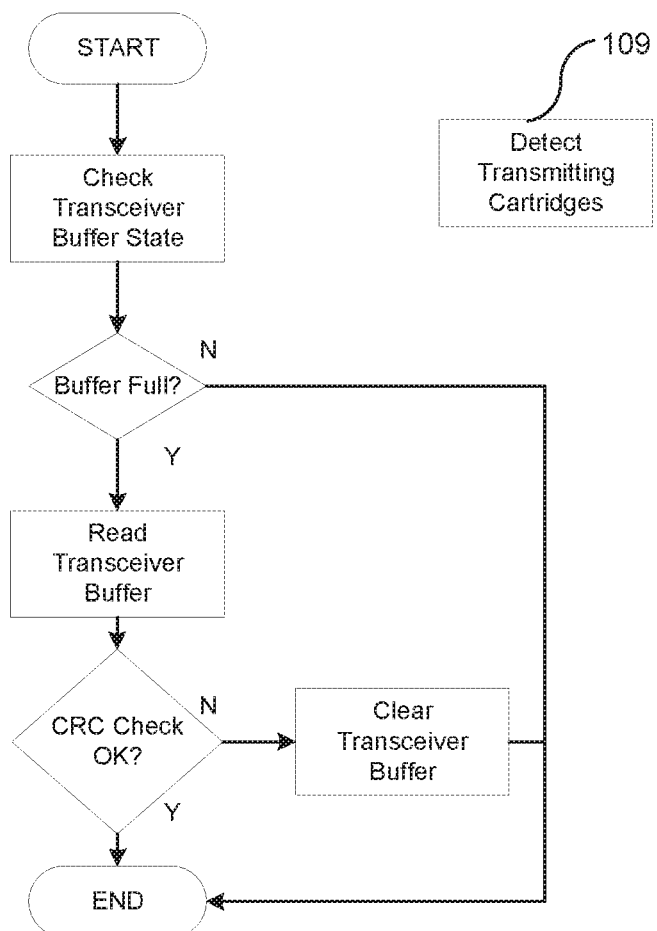
FIG. 24 is a lower level flow chart showing the detect transmitting cartridges process of the initialising phase.
Figure 25:
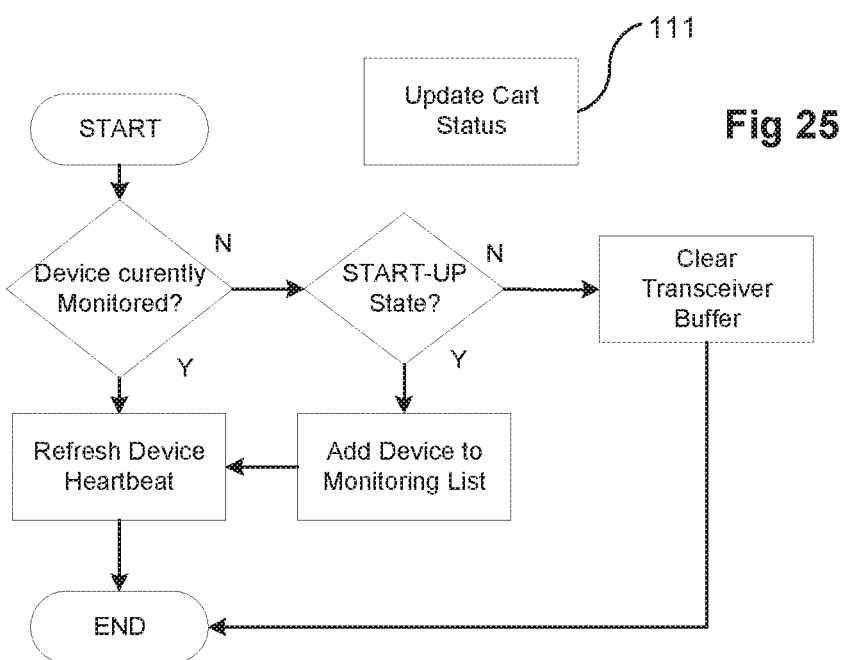
FIG. 25 is a lower level flow chart showing the update cartridge status process of the initialising phase and running phase.
Figure 26:
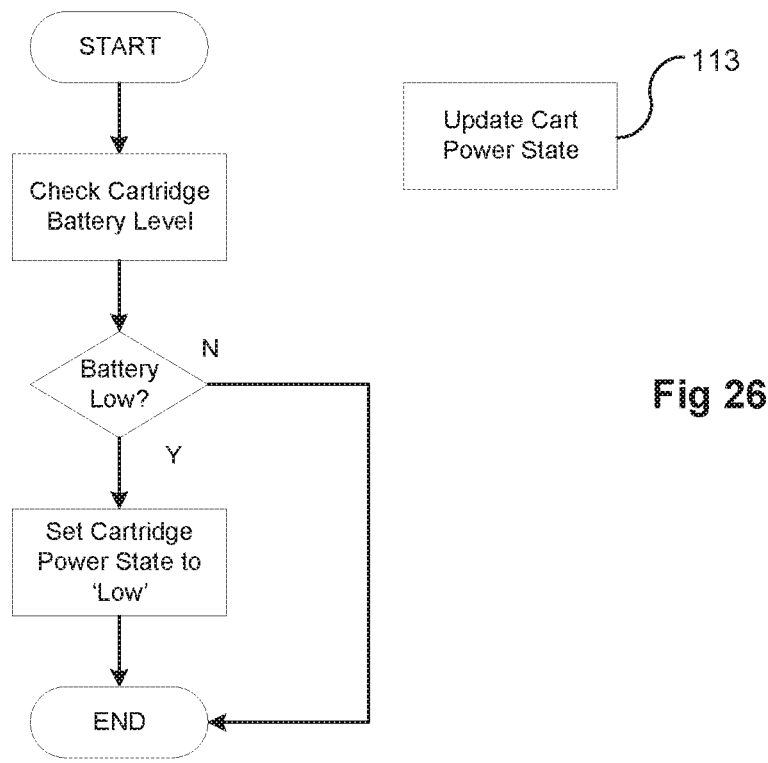
FIG. 26 is a lower level flow chart showing the update cartridge power state process of the running phase.
Figure 27:
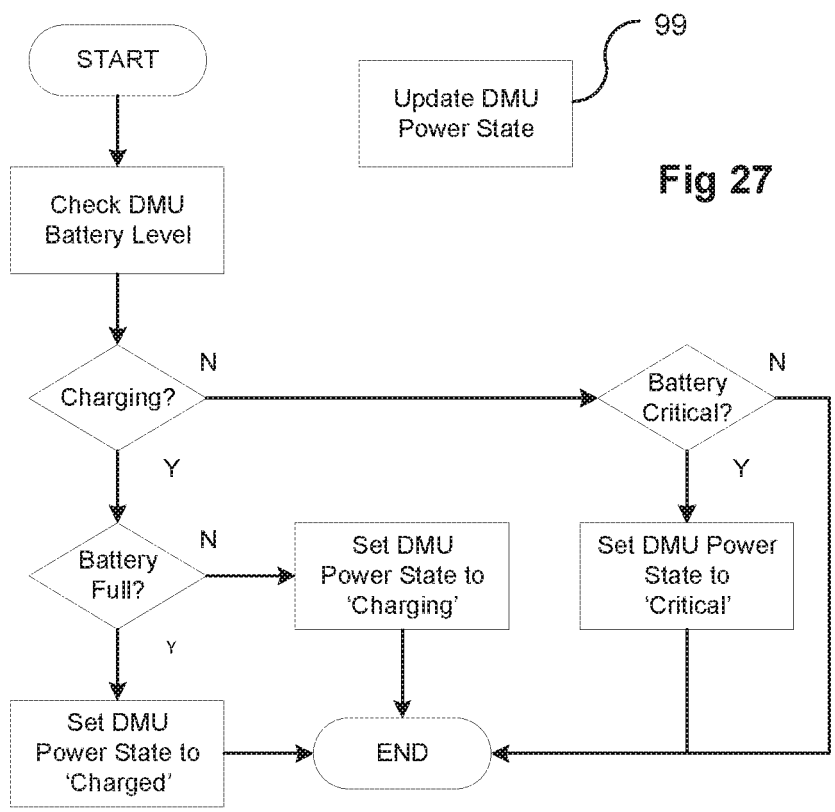
FIG. 27 is a lower level flow chart showing the update DMU power state of the running phase.
Figure 28:
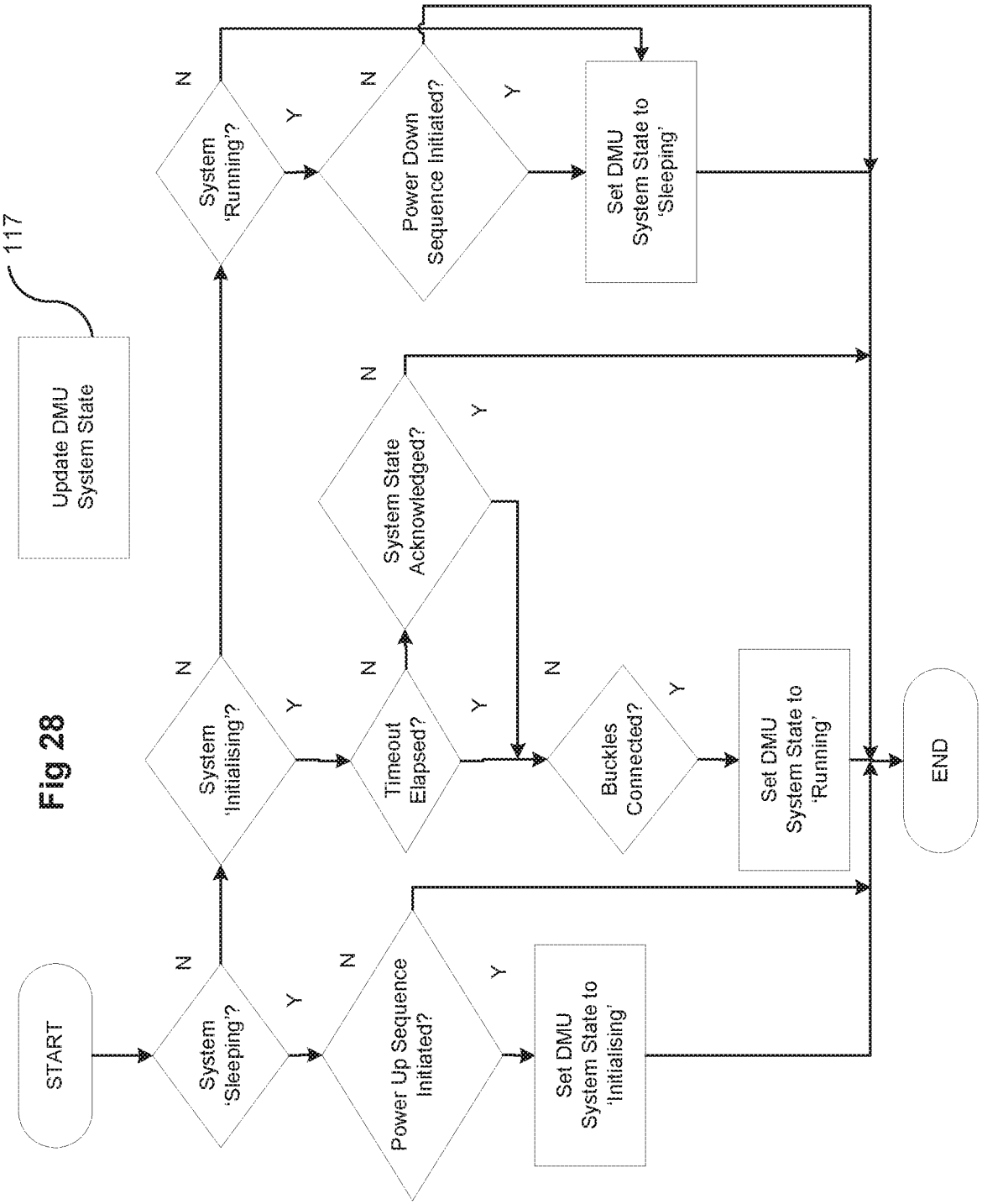
FIG. 28 is a lower level flow chart showing the update DMU system state of the initialising phase and the running phase.

The Detect Transmitting Cartridges process 109 is shown in more detail in FIG. 24; the Update Cartridge Status process 111 is shown in more detail in FIG. 25; the Update Cartridge Power State process 113 is shown in more detail in FIG. 26; and the Update DMU System State process 117 is shown in more detail in FIG. 28.

Figure 29A:
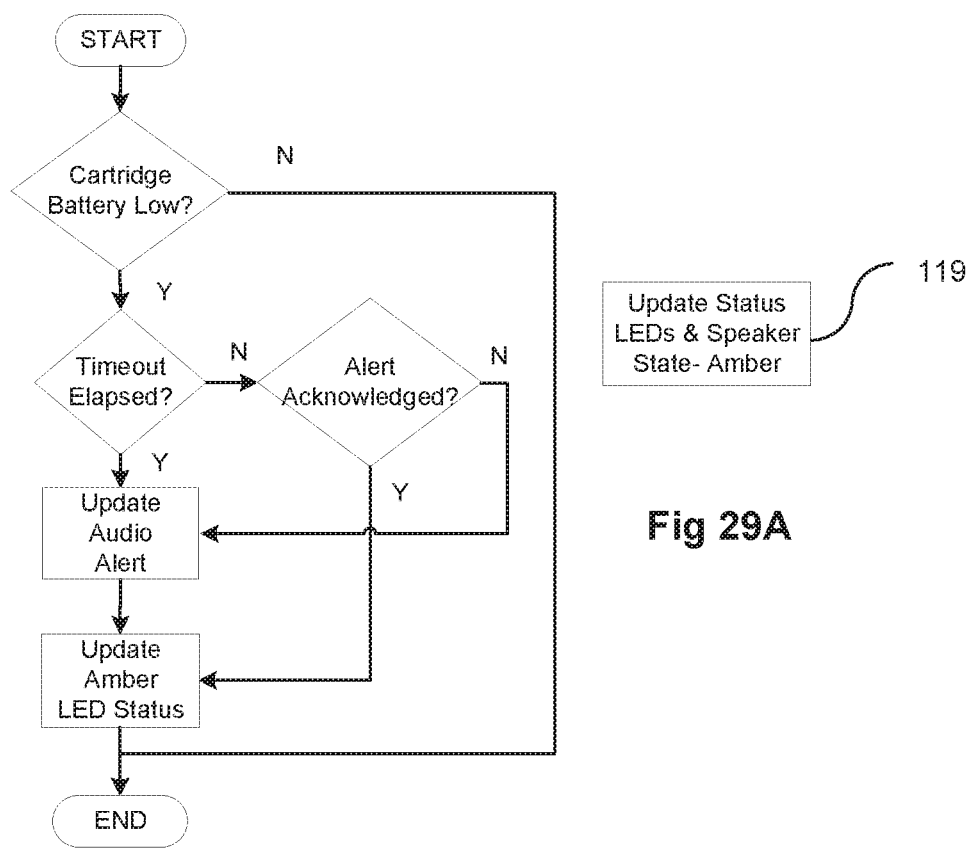
Figure 29B:
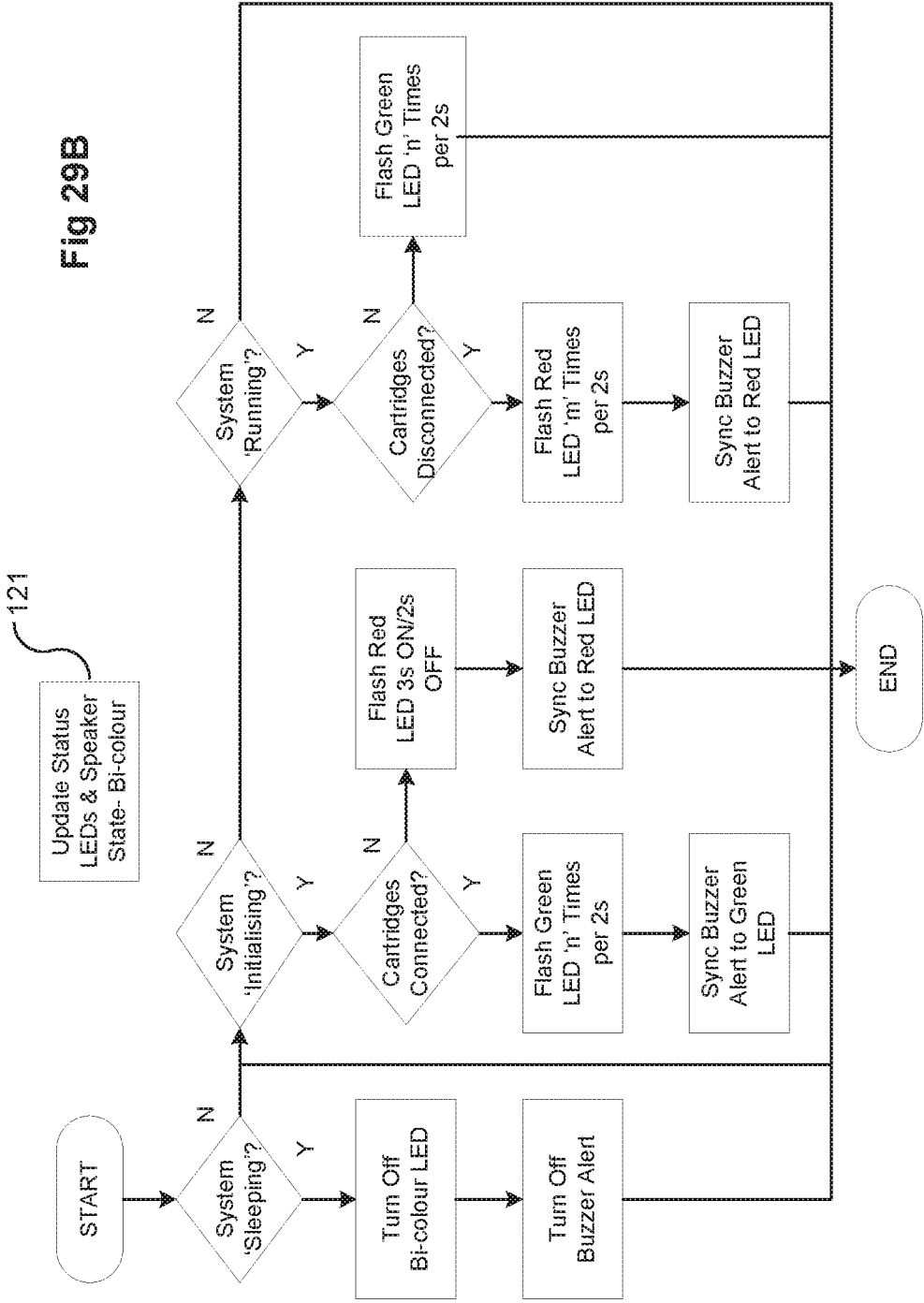
Figure 29C:
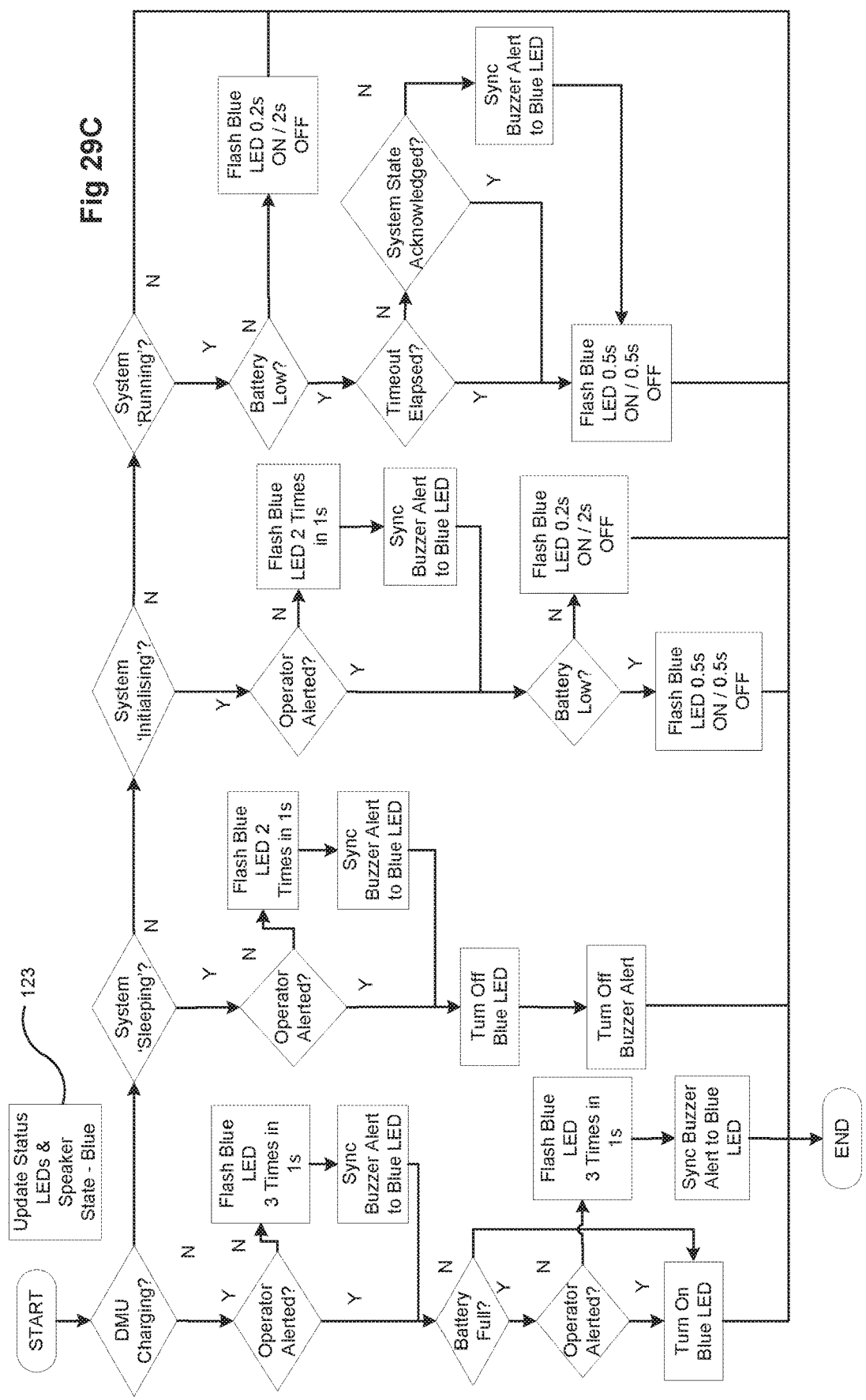

The update status LEDs & speaker state processes including more particularly:
- an Update Status LEDs & Speaker State—Amber process 119 for the amber LED shown in FIG. 29A;
- an Update Status LEDs & Speaker State—Bi-colour process 121 for the bi-colour LED shown in FIG. 29B; and
- an Update Status LEDs & Speaker State—Blue process 123 for the blue LED shown in FIG. 29C.

These flow charts are shown in low-level detail in the drawings and will not be described further.

The slave units 87 generally follow an operating process as shown in FIG. 30 after initialising. Moreover, after the master control unit 85 initialises it causes the DMU 13 to interact with the CMU 15 at step 125 and invokes the Initialise CMU process 93 as previously described with respect to FIG. 20. The Initialise CMU process 93 then initialises the CMU transceiver at 127 and runs a Cartridge Transmission Routine at step 129. The Run Cartridge Transmission Routine 129 loops as indicated, for the time that it is operating.

The Run Cartridge Transmission Routine 129 is shown in more detail in FIG. 31 and starts at 131, invoking the Update Cartridge Power Sate process 113, The Wake Up Transceiver process 135 and a Write Transmission Data To Buffer process 137. It then ascertains whether the broadcast channel is clear to transmit data at step 139 and if so, proceeds with invoking a Transmit Data process at 141. The routine proceeds with invoking a Put Transceiver to Sleep process 143 and ends at step 145.

Importantly, the Run Cartridge Transmission Routine 129 is designed to conserve power by operating mainly in a hibernating low power state, given that the duration of the routine typically takes 675 ms to loop and the transmit data process 141 when invoked to transmit at high power to the DMU 13 takes 1-2 ms to do so.

Similarly, the DMU is normally in a hibernating low-power state and only switches to high power when transmitting data to the CMU 15.

Figure 32:
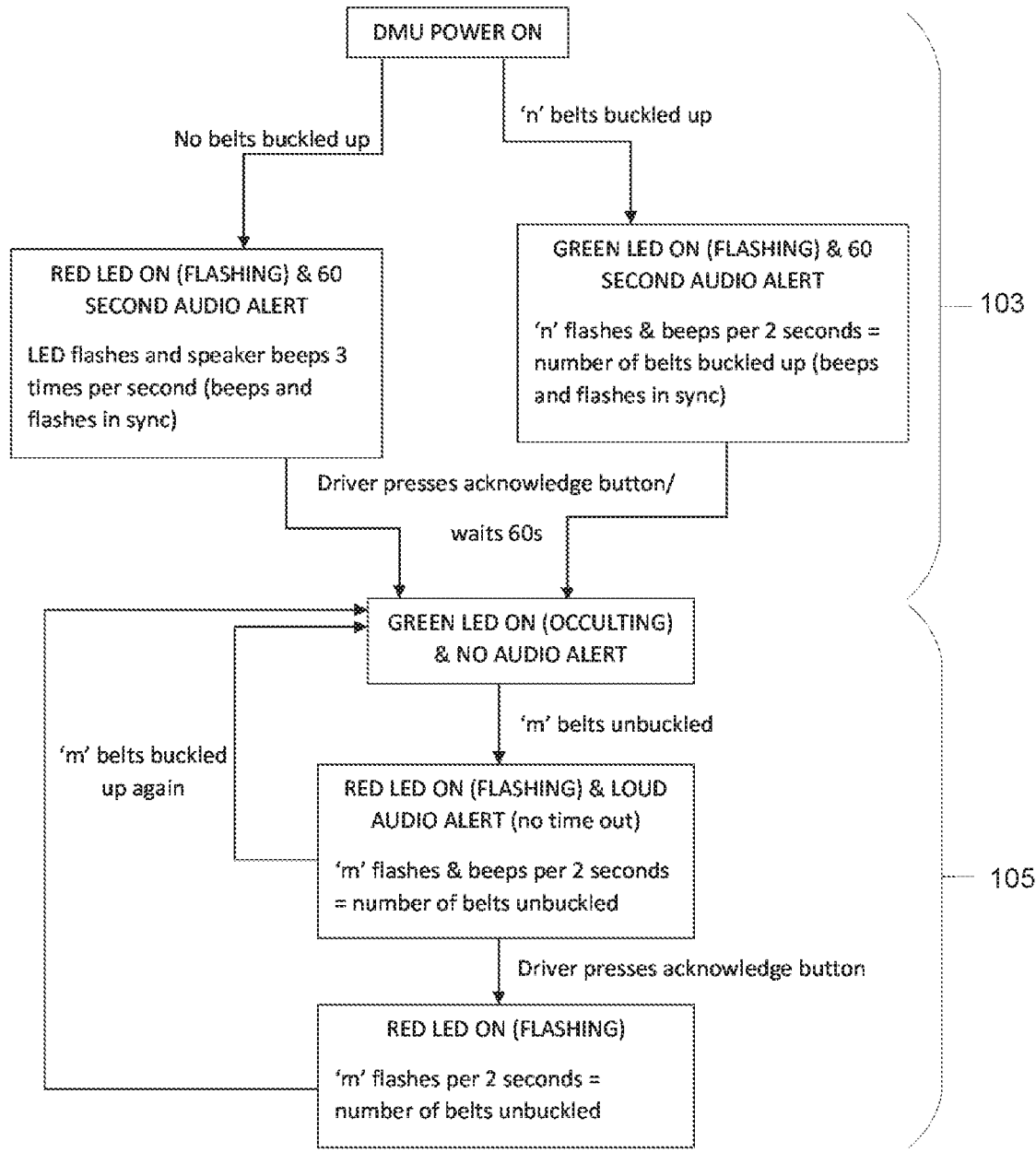
FIG. 32 is a relatively high level flow chart showing the alert LED operation during the start-up mode and the running mode with respect to the first specific embodiment.

FIG. 32 of the drawings, shows how the bi-coloured LED 27 on the DMU 13 operates to signify different functions performed by the alert and monitoring system and the state of the rear seatbelts with respect to whether they are fastened (buckled up) or not. As indicated, two LED flashing and speaker beeping functions are performed during start-up mode, depending on whether no belts are buckled up (red flashing) or whether some seatbelts are buckled up (green flashing). The DMU 13 interacts with the driver or person arming the system by this means, and after receiving an input signal via the acknowledge button 21, the DMU invokes three different modes that are cycled through during the running mode, namely a green LED on (occulting) & no audio alert mode, a red LED on (flashing) & loud audio alert mode, and a red LED on (flashing) mode, which operate as indicated.

TABLE A

| State | Visual | Audio | Comments |
|---|---|---|---|
| Power on (battery >10%) | BLUE LED occulting Duty cycle: ON 0.2 s OFF 2 s | Initial alert: Speaker emits 2 short beeps in 1 s to notify the driver that the unit is powered on. | Driver has no option to acknowledge the audio alert. |
| Power off | BLUE LED off | Speaker emits 2 short beeps in 1 s before the unit powers down. | Driver has no option to acknowledge the audio alert. |
| Power low (2% < battery ≤ 10%) | BLUE LED flashing for 15 s ON 1 s OFF 1 s | Speaker emits 1 short beep every 1 s for 15 s. | Driver has the option to acknowledge the audible alerts. Visual alerts will continue until the unit is placed on charge. |
| Power level critical (battery ≤2%) | BLUE LED flashing for 15 s ON 0.5 s OFF 0.5 s | Speaker emits 2 short beeps every 1 s for 15 s. | Driver has the option to acknowledge the audible alerts. Visual alerts will continue until the unit is placed on charge. |
| Unit charging (Unit ON) | BLUE LED on (solid) | Speaker emits 3 short beeps in 1 s when first connected to charge. | Driver has no option to acknowledge the audio alert. |
| Unit charging (Unit OFF) | BLUE LED on (solid) | — | — |
| Unit reaches full charge (Unit ON) | BLUE LED flashing ON 2 s OFF 2 s | Speaker emits 1 long beep for 1 s when the unit is fully charged. | Driver has no option to acknowledge the audio alert. |
| Unit reaches full charge (Unit OFF) | BLUE LED flashing ON 2 s OFF 2 s | — | — |

Figure 33:
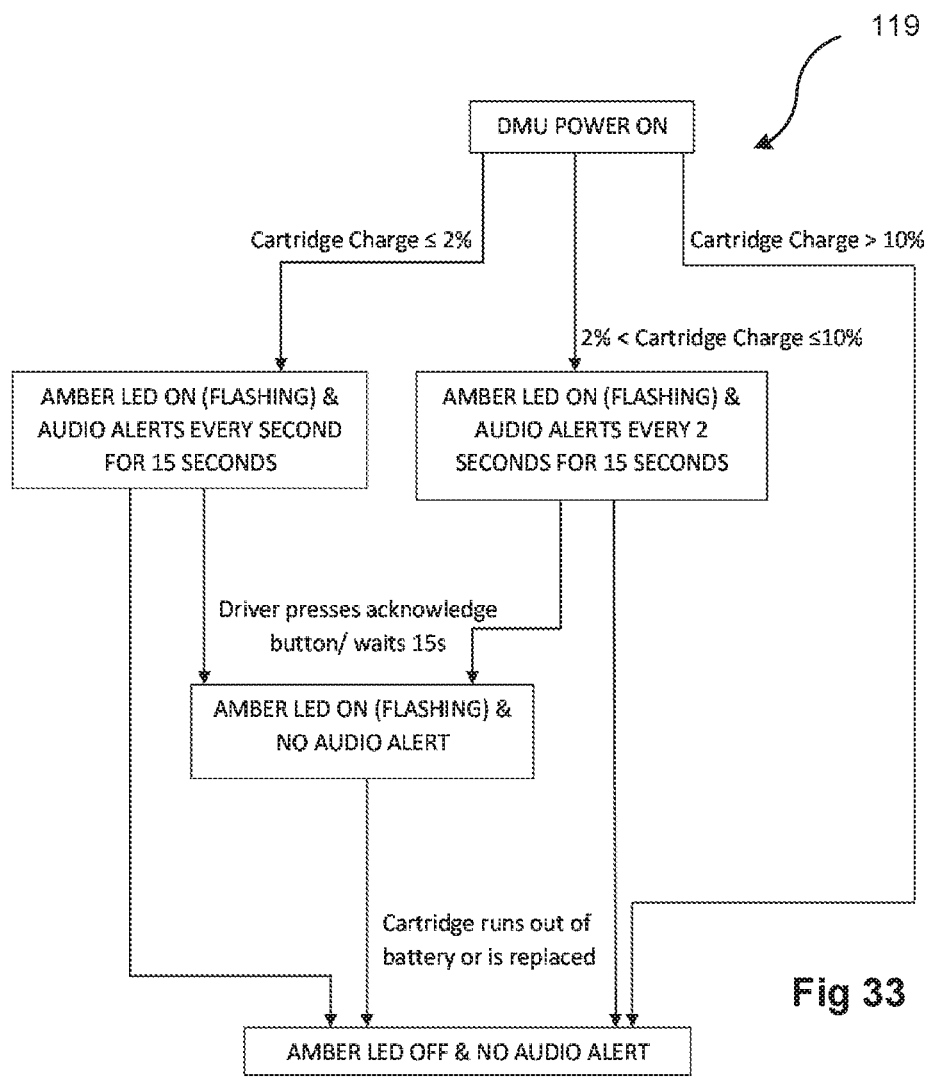
FIG. 33 is a lower level flow chart showing the cartridge battery LED process with respect to the first specific embodiment.

FIG. 33 signifies the operation of the amber LED 27 insofar as the battery status of the CMU 15 is concerned, in the manner indicated in the flow chart.

Figure 34:
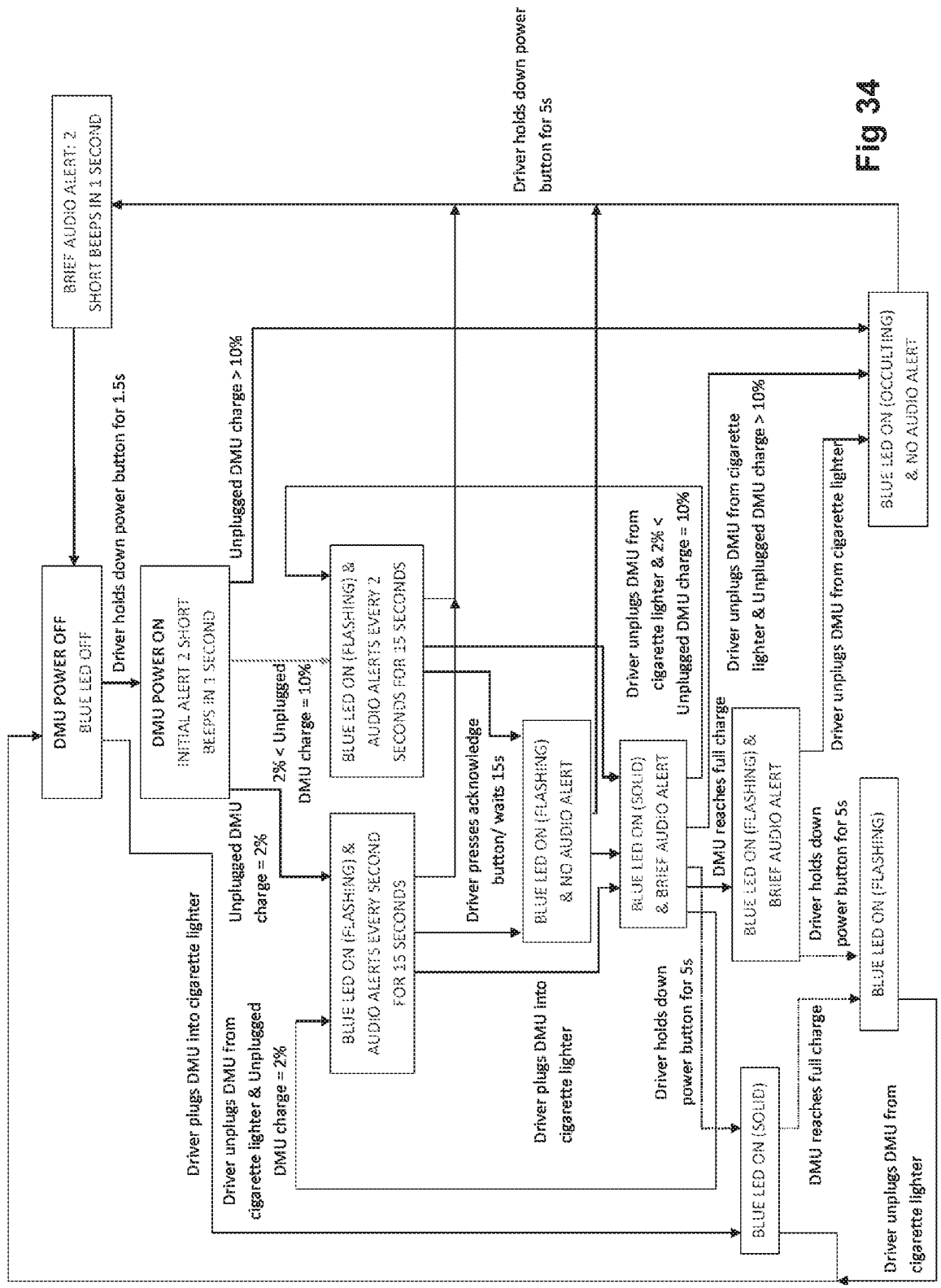
FIG. 34 is a lower level flow chart showing the DMU power LED process with respect to the first specific embodiment.

FIG. 34 signifies the operation of the blue LED in response to the different states of power supply and battery charge for the DMU in the manner indicated in the flow chart.

The operation of the power indicator LED 25 is outlined in more detail in Table A, the cartridge battery indicator LED 27 in Table B, and the bi-coloured LEDs in the initialisation phase in Table C and in the running phase with the belts unbuckled in Table D and belts buckled up in Table E.

Various examples of the operation of the bi-coloured LED 27 arising from different contingencies involving different numbers of rear seat passengers is shown in Tables F, G and H. Table F shows a manner of operation if the vehicle has no passengers in the back seat and the driver turns on the DMU.

TABLE B

| State | Visual | Audio | Comments |
|---|---|---|---|
| Adequate power (>10%) | AMBER LED off | None | |
| Power low (2% < power ≤ 10%) | AMBER LED flashing for 15 s ON 1 s OFF 1 s | Speaker emits 1 short beep followed by 1 longer beep every 2 s for 15 seconds. | Driver has the option to acknowledge audible alerts. Visual alerts will continue until the cartridge completely runs out of battery or is discarded and replaced. |
| Power level critical (≤2%) | AMBER LED flashing for 15 s ON 0.5 s OFF 0.5 s | Speaker emits 1 short beep followed by 1 longer beep every 1 s for 15 seconds. | Driver has the option to acknowledge audible alerts. Visual alerts will continue until the cartridge completely runs out of battery or is discarded and replaced. |

In the case of the vehicle having one rear passenger and two back seat sensors and the single back seat passenger buckled up before the DMU is turned on; or if the vehicle has 2/3/4/5 rear seat passengers, all with sensors installed, and they are buckled up before the engine starts, Table G shows a manner of operation of the LED 27.

TABLE C

| State | Visual | Audio | Comments |
|---|---|---|---|
| No belts buckled up | RED LED flashing (3 times per second) ON 0.16 s OFF 0.16 s | Speaker emits a 60 second audio alert. | Flashes and beeps are in sync. |
| 'n' seat belts buckled up | Green LED flashing ('n' times per 2 seconds) | Speaker emits an alert in 2 second successions for 60 seconds. | Flashes and beeps are in sync. Number of flashes/beeps per 2 seconds = number of belts buckled up |

TABLE D

| State | Visual | Audio | Comments |
|---|---|---|---|
| 'm' seat belts unbuckled | RED LED flashing ('m' times per 2 seconds) | Speaker emits an alert in 2 second successions with no alert timeout. | Flashes and beeps are in sync. Number of flashes/beeps per 2 seconds = number of belts unbuckled |
| All belts buckled up | RED LED off | None | |

TABLE E

| State | Visual | Audio | Comments |
|---|---|---|---|
| Belt buckled up | GREEN LED occulting Duty cycle: ON 0.2 s OFF 2 s | None | Flashing will continue until belts are unbuckled - belts unbuckled alerts will be triggered. |
| Belt unbuckled | GREEN LED off | (See belts unbuckled section) | |

TABLE F

| Engine Status | DMU status | Number of belt buckles with units | Number of belts buckled up | Audio Alert | Visual Alert | Driver Option |
| --- | --- | --- | --- | --- | --- | --- |
| ON | ON | n | 0 | Flashes and beeps are in sync | RED LED flashes 3 times per second for 60 seconds | Wait until alarm stops Press acknowledge button on DMU |

If after the engine of the vehicle is going and the DMU has registered seat belt(s) that are buckled up in the rear of the vehicle and then a seat belt or seat belts are then unbuckled while the engine is going, the manner of operation of the LED 27 is shown in Table H.

An important aspect of the present embodiment is that each of the slave units 87 has a unique identifier that is incorporated into the transmission packet sent from the CMU transceiver 83 to the DMU transceiver 73. This enables the specific seatbelt buckle being monitored to be identified by the DMU, and distinguished from other seatbelt buckles. In this manner, the DMU has sufficient intelligence to distinguish between a fastened and unfastened state of the seatbelt relative to the initial arming of the system during start up, so that only the state of the belt that is being used by a passenger is being monitored.

TABLE G

| Engine Status | DMU status | Number of belts which were buckled up | Number of belts currently buckled up | Audio Alert | Visual Alert | Driver Option |
| --- | --- | --- | --- | --- | --- | --- |
| ON | ON | n | n − m | 'm' beeps in 2 second successions for 60 seconds to show 'm' belts are unbuckled | RED LED flashes in sync with audio alert to indicate belts are unbuckled | Wait until alarm stops Press acknowledge button on DMU |

TABLE H

| Engine Status | DMU status | Number of belt buckles with units | Number of belts buckled up | Audio Alert | Visual Alert | Driver Option |
| --- | --- | --- | --- | --- | --- | --- |
| OFF | ON | 2 | 1 | Single audio alert in 2 second successions for 60 seconds to show one belt is buckled up. | GREEN LED is on (flashing) | Wait until alarm stops Press acknowledge button on DMU |
| OFF | ON | 2/3/4/5 | 2/3/4/5 | Alert in 2 second successions for 60 seconds. Number of beeps per 2 seconds = number of belts buckled up. (Different tone to the belt unbuckled tone) | GREEN LEDs (depending on number of belts buckled) are on (flashing) | Wait until alarm stops Press acknowledge button on DMU |

Another aspect of the present embodiment is addressing a notorious problem with previous types of retro-fitted monitoring and alarm systems being their unreliability due to inferior design of the transmission system. The particular monitoring and alarm system of the present embodiment provides for the continuous monitoring of the power state of both the DMU 13 and all CMUs 15, so that if the power state of either falls below a prescribed threshold that may affect transmission signal strength by the respective transducers at the relevant time, an alarm status is triggered at the DMU 13 signifying the problem.

Also, the particular signal transmitted in the present embodiment is of the heartbeat pulse type, which provides a higher tolerance to noise or other electrical interference that may degrade the signal transmission.

Furthermore, as has been described, the operation of the CMU 15 involves looping to repeat signal transmission when activated, which is another way of overcoming transmission interference problems.

Figure 35A:
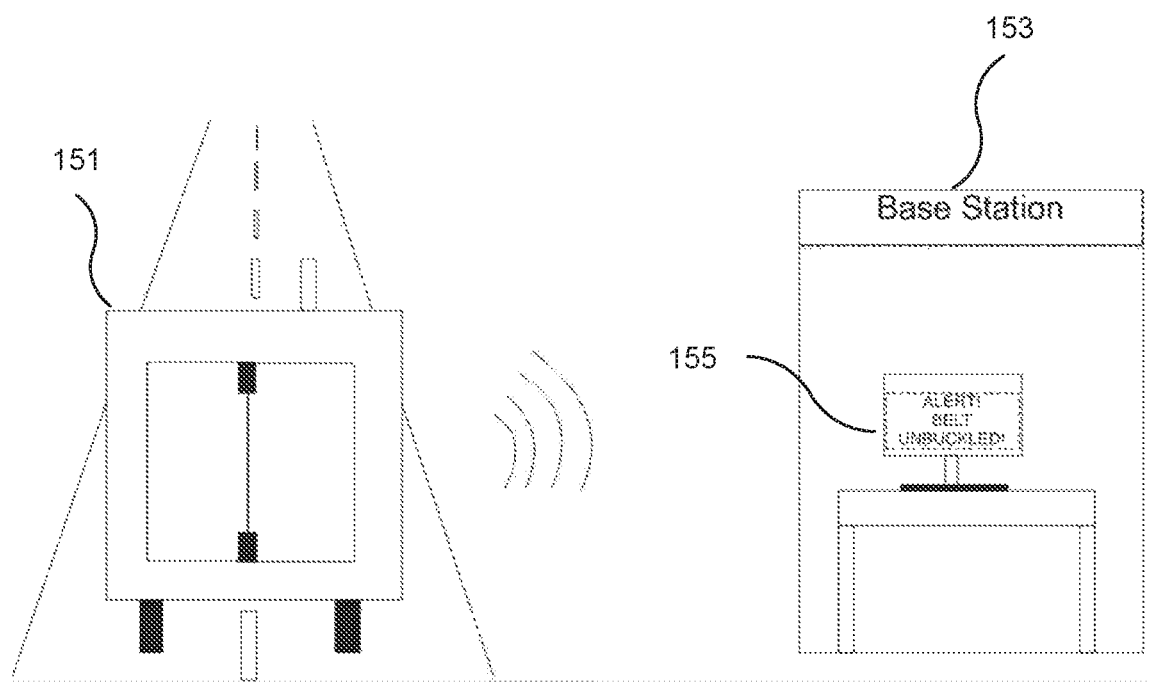
FIG. 35A is a schematic diagram showing the conceptual arrangement of the monitoring and alert system as described with respect to the second specific embodiment.
Figure 35B:
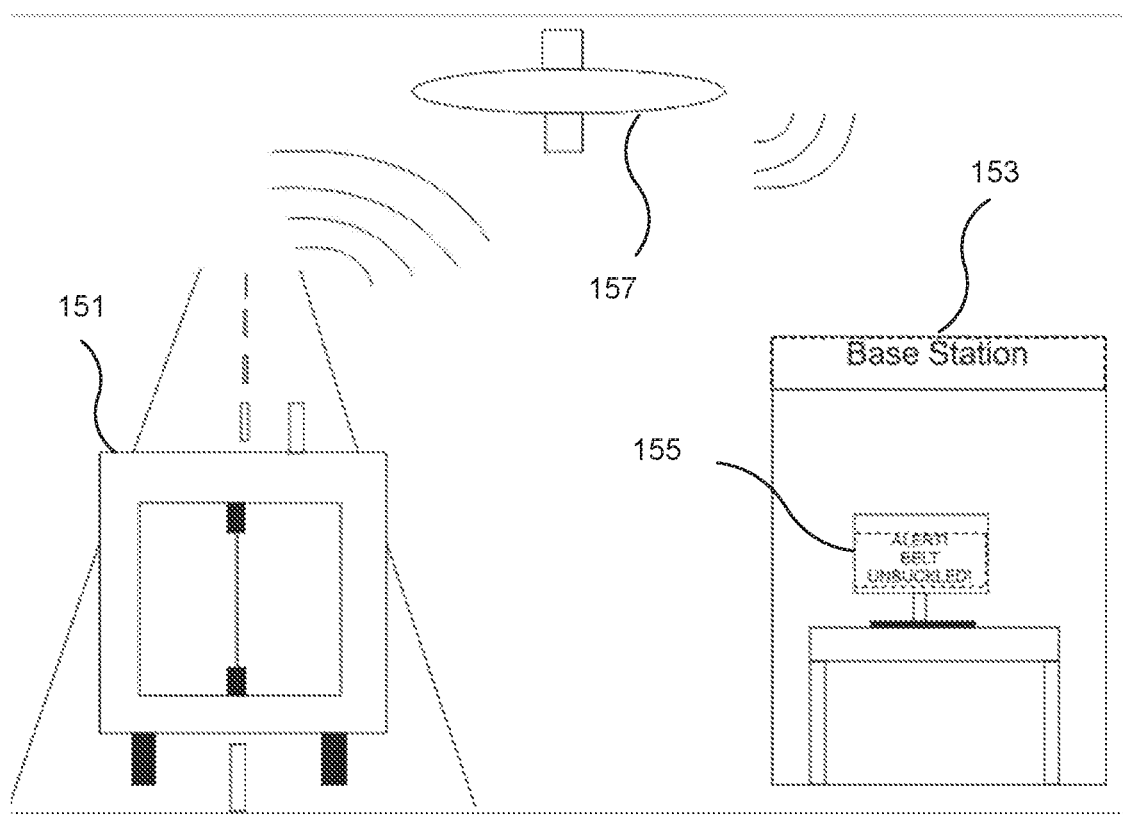
FIG. 35B shows a variation of the second specific embodiment.

The second specific embodiment is substantially the same as the preceding embodiment except that it is directed towards an application where the status of various seatbelts in a vehicle is transmitted to a base station in order to allow remote monitoring. As shown in FIGS. 35A and 35B, a vehicle 151, which may comprise a prime mover or bus requiring monitoring of the driver and/or passengers with regard to the status of their seatbelt latching, includes a transmitter attached to each seatbelt latch of the vehicle. This transmitter communicates with a transponder (not shown) that continually transmits the seatbelts latching status of each of the occupied seat of the vehicle to a base station 153. The base station 153 includes a receiver and monitor 155 that displays an alert when an active seatbelt becomes unbuckled after arming.

With monitoring vehicles in built up areas where the cellular telephone network has coverage, WiFi communication can be used. However, in situations where the vehicle may travel into the country and outside cellular telephone coverage, use can be made of satellite communication systems. FIG. 39B shows the use of a satellite 157 to receive messages from the transponder of the vehicle 151 for relaying seatbelt status information back to the base station 153 when the vehicle is unable to access a cellular communication system. This provides particular utility of the system for monitoring long-haul and tourist bus applications.

The third specific embodiment entails a different application of the monitoring and alarm system 11 to a swimming pool enclosure.

Figure 36A:
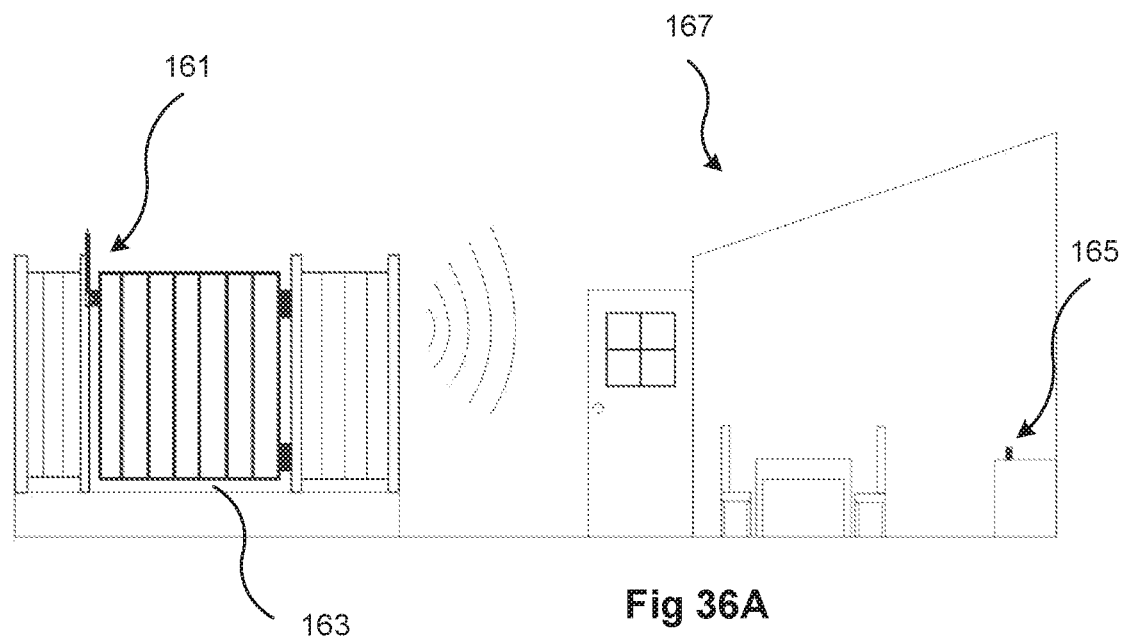
FIG. 36A is a schematic diagrams showing the conceptual arrangement of the monitoring and alert system as described with respect to the third specific embodiment.
Figure 36B:
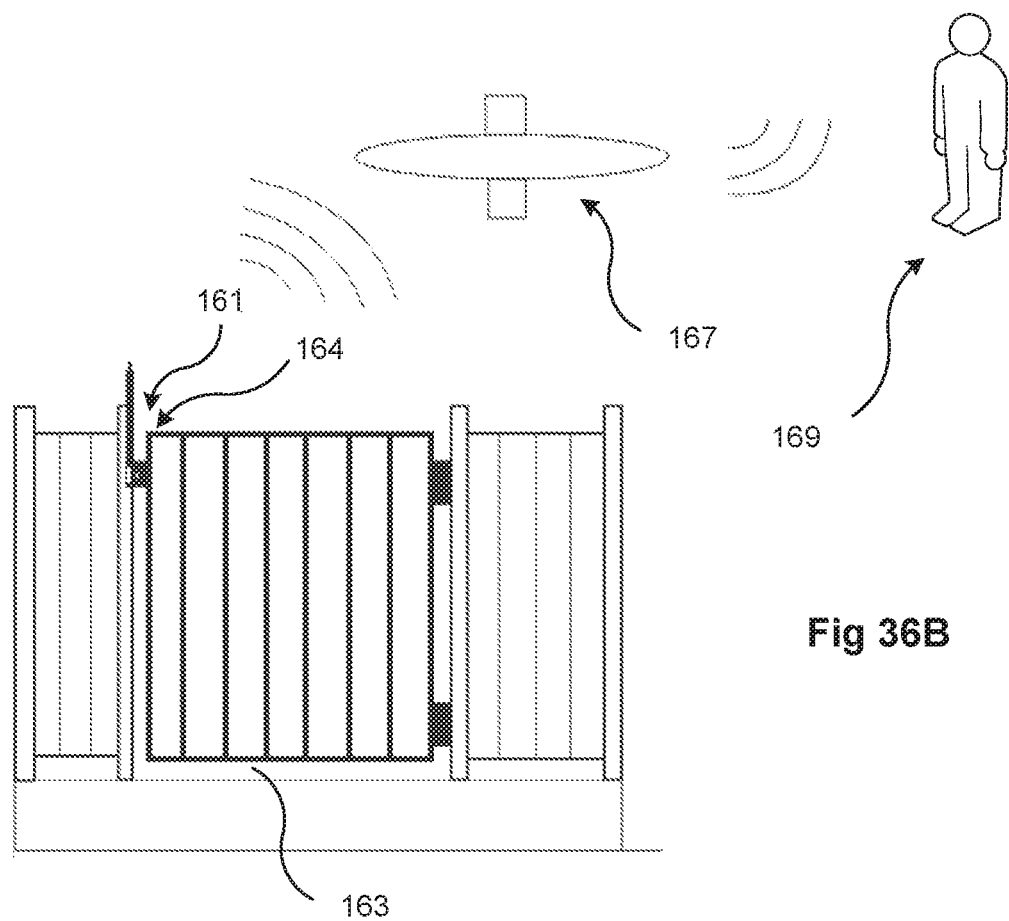
FIG. 36B shows a variation of the third specific embodiment.

As shown in FIGS. 36A and 36B, the same concept generally applies whereby a slave unit 161 is adapted for operation with the latching mechanism of a swimming pool gate 163 and communicates with a receiving unit 165 located within a dwelling 167 remote of the swimming pool enclosure.

Consequently, when the sensing components are actuated by the opening of the latch mechanism of the gate 163, an alert signal is sent to the receiving unit 165, signifying that the pool gate 163 has been unlatched and may be open. Alternatively when the latching mechanism is closed, the sensing component 164 disables generation of the alert signal and returns the transmitting unit to a hibernating mode, signifying to the receiving unit 165 that the latching mechanism is in a closed state and that the pool gate is locked.

With monitoring a pool gate 163 from a dwelling in relatively close proximity, as shown in FIG. 36A, a local WiFi network can be used. However, in an application where more remote communications are desirable to a mobile phone or someone travelling overseas for example, as shown in FIG. 36B the transceiver arrangement is designed to communicate with a cellular telephone network or via a satellite 167 to receive messages from the transmitter unit 161 of the pool gate 163 for relaying latching mechanism status information to a remote user 169 or receiver unit 165.

Obviously, the design and circuitry of the transmitter unit and receiving unit are different to that of the first embodiment, but those aspects of the process flow as outlined in FIGS. 19 to 31 will remain largely unchanged.

Figure 3:
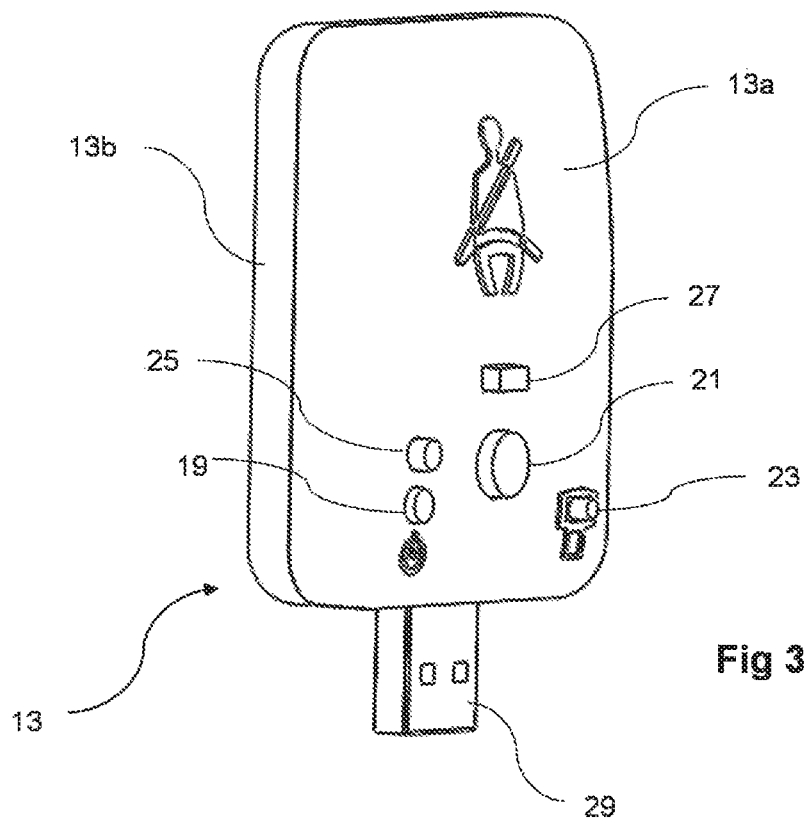
FIG. 3 is a front perspective view showing the DMU of FIG. 1.
Figure 4:
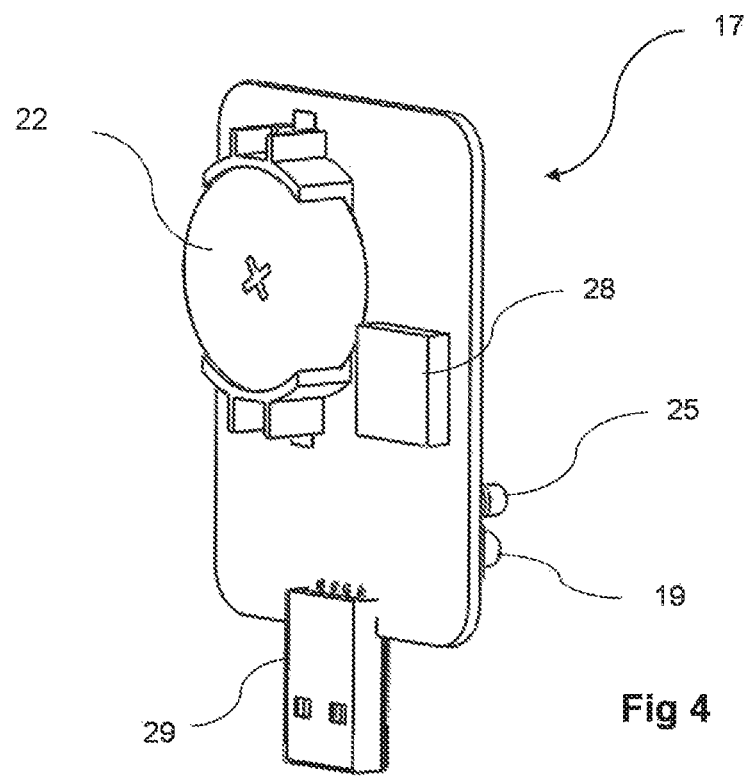
FIG. 4 is a front perspective view showing the DMU printed circuit board (PCB) that is encapsulated within the casing of the DMU of FIG. 3.

In the above description and illustrations, the DMU 13 has a male USB plug 29 as illustrated in FIG. 3. However, it will be understood that a female USB socket or similar socket can be provided which will allow a patch cord to connect having a male USB end to connect to it, so as to plug such a female socket into a power source to recharge the one or more batteries in the DMU13.

It should be appreciated that the scope of the present invention is not limited to the particular embodiments described herein. Thus, the monitoring and alert system may find utility with other applications requiring only slight modification or configuration of the system described to adapt it for use in these applications, without departing from the spirit or scope of the invention.

The invention claimed is:

1. A monitoring and alert system for detecting an activity status of a sensorially perceptible device, the system comprising:
   a master control unit to be located proximate to an operator of the system, comprising a user interface having:
   (a) an input enabling an operator to arm the system and then allow it to operate with minimal interaction of the operator:
   (b) an output alerting the operator as to status of the system in relation to a plurality of prescribed conditions: and
   (c) a master processor providing functionality of the master control unit;
   one or more slave units each being fixedly attached to a discrete sensorially perceptible device for detecting an activity status thereof, each slave unit comprising:
   (i) a sensor to detect whether the sensorially perceptible device is in an active state or an inactive state, and
   (ii) a slave processor to provide functionality of the slave unit;
   a wireless communicator including a master transceiver forming part of the master control unit and a slave transceiver forming part of each slave unit for communicating periodically status and alert signals between the master control unit and each of the slave units; and
   the master processor and the slave processor being designed to invoke various initialising processes and running processes for the master control unit and each of the slave units during an initialising phase and a running phase respectively, involving interaction with the operator via the user interface, the initialising processes and running processes including a detect slave process and an update slave process where each of the slave units has a unique identifier to be incorporated into a transmission packet to be sent between the master control unit and a said slave unit to enable the particular slave unit to be identified by the master control unit:

wherein the master control unit includes:
(i) an initialising process to uniquely register each identified slave unit that is active in a received transmission packet during the initialising phase; and
(ii) a running process to update a latching status identified for each registered slave unit in a received transmission packet during the running phase
and wherein said stave unit also comprises: a slave power supply to providing local power to the slave unit; and a slave power supply monitor to monitor local power supplied to the slave unit and indicate when a level of local power is below a prescribed threshold for reliable operation thereof; and wherein during the running phase the master processor is designed to invoke:
(A) a system state process to ascertain latest activity status of each of the slave units whilst ensuring minimal power consumption by the master control unit;
(B) a power state process to check with the slave power supply monitor that the local power level is not below the prescribed threshold;
(C) a user interface process to process input signals from the input and update the output to convey the latest latching and power state to the operator.

2. A monitoring and alert system as claimed in claim 1, wherein the slave processor is designed to invoke a slave unit status routine to transmit: a power alert signal if the slave power supply monitor indicates that the local power is below a prescribed threshold; and the activity status of the slave unit, whilst ensuring minimal power consumption by the slave unit.

3. A monitoring and alert system as claimed in claim 1, wherein each slave unit is designed to continuously loop through a series of running processes during the running phase additional to the updating of the latching status to:
(i) update its power state;
(ii) wake up the slave transceiver to send the transmission packet to the master control unit;
(iii) ascertain whether a broadcast channel is clear to transmit data;
(iv) and if so, transmit the transmission packet to the master control unit; and
(v) put the slave transceiver to sleep;
the communicator comprises the master transceiver forming part of the master control unit and the slave transceiver forming part of each slave unit for wirelessly communicating status and alert signals between the master control unit and each of the slave units.

4. A monitoring and alert system as claimed in claim 3, wherein the running process for putting the transceiver to sleep comprises a sleep process for the slave unit being invoked during a sleeping phase that cycles through a hibernating low power state and high power transmitting state, to communicate an update of the latching status to the master control unit.

5. A monitoring and alert system as claimed in claim 1, wherein the master control unit includes:
(a) a master power supply providing local power to the master control unit; and
(b) a master power supply monitor to monitor the local power supplied to the master control unit and to indicate when a level of local power is below a prescribed threshold for reliable operation thereof.

6. A monitoring and alert system as claimed in claim 2, wherein the master control unit and each slave unit is designed to operate mainly in a hibernating low power state during the running phase where the master control unit and the each slave unit switches to high power when transmitting data.

7. A monitoring and alert system as claimed in claim 1, wherein the master control unit includes a process for updating a visual status of the latching state monitored by the slave units and an audio and visual alarm of alert signals from the master control unit and the slave units, the process being designed to invoke different running processes to display different activity states and alarms depending upon the states contained within a received transmission packet from each active slave unit including:
(a) a running process to display one color and to issue an audio alarm for the slave unit when the slave unit power source is below the prescribed threshold;
(b) a running process to display one of two different color and to issue and alarm for the slave unit depending upon the latching state of each slave unit;
(c) a running process to display another color and to issue an audio alarm for the master control unit when the master control unit power source is below a prescribed threshold.

8. A master control unit as claimed in claim 7, wherein the master control unit and each slave unit is designed to operate mainly in a hibernating low power state during the running phase where the units switch to high power when transmitting data.

9. A master control unit for a monitoring and alert system for detecting an activity status of a sensorially perceptible device including one or more slave units each being fixedly attached to a discrete sensorially perceptible device for detecting the activity status thereof, each slave unit comprising:
(i) a sensor to detect whether the sensorially perceptible device is in an active state or an inactive state;
(ii) a slave transceiver forming part of a wireless communicator for communicating periodically status and alert signals to the master control unit
(iii) a slave power supply for providing local power to the slave unit; and
(iv) a slave power supply monitor to monitor local power supplied to the slave unit and to indicate when a level of local power is below a prescribed threshold for reliable operation thereof;
the master control unit to be located proximate to an operator of the system and comprising:
(a) a user interface having: an input to enable an operator to arm the system and then allow it to operate with minimal interaction of the operator; and an output for alerting the operator as to status of the system in relation to a plurality of prescribed conditions;
(b) a master processor to provide the functionality of the master control unit; and
(c) a master transceiver forming part of the wireless communicator for communicating status and alert signals between the master control unit and each of the slave units;
wherein the master processor is designed to invoke various master initialising processes and running processes for the master control unit during an initialisation phase and running phase respectively involving interaction with the operator via the user interface, the master initialising processes and running processes including a detect slave process to communicate with each slave unit where each of the slave units has a unique identifier to be incorporated into a transmission packet to be sent between the master control unit and said slave unit to enable the particular slave unit to be identified by the master control unit;

and wherein during a the running phase the master processor is designed to invoke:
(A) a system state process to ascertain latest activity status of each of the slave units whilst ensuring minimal power consumption by the master control unit;
(B) a power state process to check with the slave power supply monitor that the local power level is not below the prescribed threshold;
(C) a user interface process to process input signals from the input and update the output to convey the latest activity status and power state to the operator.

10. A master control unit as claimed in claim 9, wherein a slave processor is designed to invoke a slave unit status routine to transmit: a power alert signal if the slave power supply monitor indicates that the local power is below the prescribed threshold; and the latching activity status of the slave unit, whilst ensuring minimal power consumption by the slave unit.

11. A master control unit as claimed in claim 9, having a master power supply for providing local power to the master control unit; and a master power supply monitor to monitor local power supplied to the master control unit and to indicate when a level of local power is below a prescribed threshold for reliable operation thereof.

12. A master control unit as claimed in claim 9, wherein the master control unit includes a process for updating visual status of the activity status monitored by the slave units and an audio and visual alarm of alert signals from the master control unit and the slave units, a running process being designed to invoke different running processes to display different activity states and alarms depending upon the states contained within a received transmission packet from each active slave unit including:
(a) the running process to display one color and to issue an audio alarm for the slave unit when the slave unit power source is below the prescribed threshold;
(b) the running process to display one of two different colors and to issue and alarm for the slave unit depending upon the activity status of each slave unit;
(c) the running process to display another color and to issue the audio alarm for the master control unit when the master control unit power source is below the prescribed threshold.

13. A master control unit as claimed in claim 9, wherein the master control unit includes
(i) an initialising process to uniquely register each identified slave unit that is active in a received transmission packet during the initialising phase; and
(ii) a running process to update the activity status identified for each registered slave unit in a received transmission packet during the running phase.

14. A master control unit as claimed in claim 9, wherein the wireless communicator is designed to use a heartbeat pulse type signal for communicating the status and alert signals between the master control unit and each of the slave units.

15. A slave unit for a monitoring and alert system for sensorially perceptible devices, including a master control unit to be located proximate to an operator of the system, the master control unit comprising:
(a) a user interface having: an input to enable the operator to arm the system and then allow it to operate with minimal interaction of the operator; and an output for alerting the operator as to status of the system in relation to a plurality of prescribed conditions;
(b) a master processor providing functionality of the master control unit; and
(c) a master transceiver forming part of a wireless communicator for communicating status and alert signals from the slave unit;
the slave unit being fixedly attached to a discrete sensorially perceptible device for detecting an activity status thereof, each slave unit comprising:
(i) a sensor to detect whether the sensorially perceptible device is in an active state or an inactive state,
(ii) a slave processor to provide the functionality of the slave unit;
(iii) a slave transceiver forming part of the wireless communicator for communicating periodically status and alert signals between the slave unit and the master control unit;
(iv) a slave power supply providing local power to the slave unit; and
(v) a slave power supply monitor to monitor local power supplied to the slave unit and to indicate when a level is below a prescribed threshold for reliable operation thereof;
wherein the slave processor is designed to invoke various slave initialising processes and running processes for the slave unit during an initialisation phase and running phase respectively, involving interaction with the master control unit to communicate the activity status of the slave unit, the initialising processes and running processes including a detect slave process and an update slave process where each of the slave units has a unique identifier to be incorporated into a transmission packet to be sent between the master control unit and said slave unit to enable the particular slave unit to be identified by the master control unit;
and wherein during the running phase the slave processor, in response to the master processor, is designed to invoke:
(A) an update status process to provide latest activity status of the slave unit whilst ensuring minimal power consumption; and
(B) an update power state process to indicate that the local power level is not below the prescribed threshold.

16. A slave unit as claimed in claim 15, wherein the slave processor invokes a slave unit status routine to transmit a power alert signal if the slave power supply monitor indicates that the local power is below the prescribed threshold, and the activity status of the slave unit, whilst ensuring minimal power consumption by the slave unit.

17. A slave unit as claimed in claim 15, wherein each slave unit is designed to continuously loop through a series of running processes during the running phase additional to the updating of the activity status to:
(i) update its power state;
(ii) wake up the transceiver to send a transmission packet to the master control unit;
(iii) ascertain whether a broadcast channel is clear to transmit data;
(iv) and if so, transmit the transmission packet to the master control unit; and
(v) put the transceiver to sleep.

18. A slave unit as claimed in claim 17, wherein the running process for putting the transceiver to sleep comprises a sleep process for the slave unit being invoked during a sleeping phase that cycles through a hibernating low power state and high power transmitting state, to communicate an update of the activity status to the master control unit.

19. A slave unit as claimed in claim 15, wherein the wireless communicator is designed to use a heartbeat pulse type signal for communicating the status and alert signals between the master control unit and each of the slave units.

20. A method for monitoring and alerting an activity status of a sensorially perceptible device, the method including:
  wirelessly communicating periodically status and alert signals in a transmission packet between one or more slave units, fixedly attached to the sensorially perceptible device, and a master control unit for being located proximate to an operator; during an initialisation phase:
  (i) a locally powered initializing the master control unit to uniquely register an identified slave unit that is active in a received transmission packet from one or more slave units to determine the activity status of the sensorially perceptible device, to which the slave unit is attached; and
  (ii) arming the system to allow it to operate with minimal interaction of an operator; during a running phase;
  (A) the master control unit:
    (a) updating the activity status identified by each registered slave unit in the received transmission packet;
    (b) alerting the operator as to status of the system in relation to a plurality of prescribed conditions; and
    (c) communicating status and alert signals from the slave unit;
  (B) each slave unit:
    (a) detecting whether the sensorially perceptible device is in an active state or an inactive state;
    (b) providing local power to the slave unit;
    (c) monitoring local power supplied to the slave unit and indicating when a level of local power is below a prescribed threshold for reliable operation thereof;
    (d) providing latest activity status of the slave unit whilst ensuring minimal power consumption; and
    (e) indicating that the local power level is not below the prescribed threshold.

21. A method as claimed in claim 20, including: each slave unit continuously looping through a series of running processes, including:
  (a) ascertaining latest activity status of the sensorially perceptible device associated therewith whilst ensuring minimal power consumption by the slave unit by checking that local power level of the registered slave unit is not below the prescribed threshold for reliable operation thereof;
  (b) updating its power state to indicate that that the local power level is not below the prescribed threshold;
  (c) waking up to send a transmission packet to the master control unit;
  (d) ascertaining whether a broadcast channel is clear to transmit data;
  (e) if so, transmitting the transmission packet to the master control unit; and
  (f) going to sleep.

22. A method as claimed in claim 20, including during the running phase of the master control unit: the master control unit:
  (i) ascertaining the activity status of each of the slave units whilst ensuring minimal power consumption by the master control unit;
  (ii) checking that the local power level of the slave control unit is not below the prescribed threshold; and
  (iii) conveying the latest activity and power state to the operator.

* * * * *